(12) United States Patent
Hanamoto et al.

(10) Patent No.: US 10,019,453 B2
(45) Date of Patent: Jul. 10, 2018

(54) RECORDING MEDIUM, SEARCH METHOD, AND INFORMATION PROCESSING APPARATUS

(71) Applicants: FUJITSU LIMITED, Kawasaki-shi, Kanagawa (JP); HONDA MOTOR CO., LTD., Minato-ku, Tokyo (JP)

(72) Inventors: Kazuhisa Hanamoto, Kawasaki (JP); Kou Kawanobe, Saitama (JP); Yasuo Kurosaki, Wako (JP); Kenji Nishimiya, Wako (JP)

(73) Assignees: FUJITSU LIMITED, Kawasaki (JP); HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 14/140,671

(22) Filed: Dec. 26, 2013

(65) Prior Publication Data

US 2014/0188850 A1 Jul. 3, 2014

(30) Foreign Application Priority Data

Dec. 27, 2012 (JP) .................................. 2012-286155

(51) Int. Cl.
*G06F 7/00* (2006.01)
*G06F 17/30* (2006.01)

(52) U.S. Cl.
CPC .. *G06F 17/30103* (2013.01); *G06F 17/30091* (2013.01); *G06F 17/30112* (2013.01)

(58) Field of Classification Search
CPC ......... G06F 17/3028; G06F 2221/2101; G06F 21/6209; G06F 2221/2113
See application file for complete search history.

(56) References Cited

U.S. PATENT DOCUMENTS

| 7,236,966 B1* | 6/2007 | Jackson ............ G06F 17/30867 |
| 2002/0062367 A1* | 5/2002 | Debber .................. G06Q 10/06 709/224 |
| 2008/0243831 A1* | 10/2008 | Kunitake .......... G06F 17/30634 |
| 2009/0222420 A1* | 9/2009 | Hirata ................... G06F 3/0484 |
| 2011/0231385 A1* | 9/2011 | Wang ................ G06F 17/30864 707/709 |
| 2012/0096389 A1* | 4/2012 | Flam ................... G06F 17/3089 715/777 |

(Continued)

FOREIGN PATENT DOCUMENTS

| CN | 101281526 A | 10/2008 |
| JP | 8-194610 | 7/1996 |

(Continued)

OTHER PUBLICATIONS

Japanese Office Action dated May 24, 2016 in corresponding Japanese Patent Application No. 2012-286155.

(Continued)

*Primary Examiner* — Tuan A Pham
(74) *Attorney, Agent, or Firm* — Staas & Halsey LLP

(57) ABSTRACT

A file management server displays, according to selection order of first information and second information, either a relationship that the first information is subordinate to the second information or a relationship that the second information is subordinate to the first information as a subordinate relationship to be set.

10 Claims, 15 Drawing Sheets

(56) References Cited

U.S. PATENT DOCUMENTS

| | | | | |
|---|---|---|---|---|
| 2012/0310963 A1* | 12/2012 | Seo | ................... | G06F 17/30513 |
| | | | | 707/758 |
| 2013/0166560 A1* | 6/2013 | Secord | .............. | G06F 17/30038 |
| | | | | 707/738 |
| 2013/0262385 A1* | 10/2013 | Kumarasamy | .... | G06F 17/30082 |
| | | | | 707/634 |

FOREIGN PATENT DOCUMENTS

| | | |
|---|---|---|
| JP | 9-101884 | 4/1997 |
| JP | 9-223008 | 8/1997 |
| JP | 10-254691 | 9/1998 |
| JP | 2002-312404 | 10/2002 |
| JP | 2010-67084 | 3/2010 |

OTHER PUBLICATIONS

Japanese Office Action dated Jan. 31, 2017 in corresponding Japanese Patent Application No. 2012-286155.
Chinese Office Action dated Aug. 25, 2016 in corresponding Chinese Patent Application No. 201310722411.7.
Japanese Office Action dated Aug. 15, 2017 in corresponding Japanese Patent Application No. 2012-286155.
Chinese Office Action dated Mar. 17, 2017 in corresponding Chinese Patent Application No. 201310722411.7.
Japanese Office Action dated Aug. 15, 2017 in corresponding Japanese Patent Application No. 2017-006331.

* cited by examiner

FIG.4

| OBJECT ID | TYPE | FOLDER | ELEMENT | FILE ELEMENT |
|---|---|---|---|---|
| object0001 | FOLDER | FUNCTIONAL REQUIREMENTS | – | – |
| object0002 | FILE | FUNCTIONAL REQUIREMENTS | FUNCTIONAL REQUIREMENTS DOCUMENT | – |
| object0003 | ELEMENT | FUNCTIONAL REQUIREMENTS | FUNCTIONAL REQUIREMENTS DOCUMENT | FUNCTIONAL REQUIREMENT 1 |
| object0004 | ELEMENT | FUNCTIONAL REQUIREMENTS | FUNCTIONAL REQUIREMENTS DOCUMENT | FUNCTIONAL REQUIREMENT 2 |
| object0005 | FOLDER | FUNCTIONAL DESIGN | – | – |
| object0006 | FILE | FUNCTIONAL DESIGN | FUNCTION A DESIGN DOCUMENT | – |
| object0007 | ELEMENT | FUNCTIONAL DESIGN | FUNCTION A DESIGN DOCUMENT | FUNCTION A1 DESIGN |
| object0008 | ELEMENT | FUNCTIONAL DESIGN | FUNCTION A DESIGN DOCUMENT | FUNCTION A2 DESIGN |
| object0009 | FILE | FUNCTIONAL DESIGN | FUNCTION B DESIGN DOCUMENT | – |
| object0010 | ELEMENT | FUNCTIONAL DESIGN | FUNCTION B DESIGN DOCUMENT | FUNCTION B1 DESIGN |
| object0011 | FOLDER | FUNCTIONAL DETAILED DESIGN | – | – |
| object0012 | FILE | FUNCTIONAL DETAILED DESIGN | FUNCTION A1 DETAILED DESIGN DOCUMENT | – |
| object0013 | ELEMENT | FUNCTIONAL DETAILED DESIGN | FUNCTION A1 DETAILED DESIGN DOCUMENT | DETAILED DESIGN (a) |
| object0014 | ELEMENT | FUNCTIONAL DETAILED DESIGN | FUNCTION A1 DETAILED DESIGN DOCUMENT | DETAILED DESIGN (b) |
| object0015 | FILE | FUNCTIONAL DETAILED DESIGN | FUNCTION A2 DETAILED DESIGN DOCUMENT | – |
| object0016 | ELEMENT | FUNCTIONAL DETAILED DESIGN | FUNCTION A2 DETAILED DESIGN DOCUMENT | DETAILED DESIGN ($\alpha$) |
| object0017 | FILE | FUNCTIONAL DETAILED DESIGN | FUNCTION B1 DETAILED DESIGN DOCUMENT | – |
| object0018 | ELEMENT | FUNCTIONAL DETAILED DESIGN | FUNCTION B1 DETAILED DESIGN DOCUMENT | DETAILED DESIGN (i) |
| object0019 | FOLDER | REQUIREMENTS TEST SPECIFICATIONS | – | – |
| object0020 | FILE | REQUIREMENTS TEST SPECIFICATIONS | REQUIREMENT 1 TEST SPECIFICATION DOCUMENT | – |
| object0021 | ELEMENT | REQUIREMENTS TEST SPECIFICATIONS | REQUIREMENT 1 TEST SPECIFICATION DOCUMENT | TEST SPECIFICATION 1 |
| object0022 | FOLDER | FUNCTIONAL TEST SPECIFICATIONS | – | – |
| object0023 | FILE | FUNCTIONAL TEST SPECIFICATIONS | FUNCTION A1 TEST SPECIFICATION DOCUMENT | – |
| object0024 | ELEMENT | FUNCTIONAL TEST SPECIFICATIONS | FUNCTION A1 TEST SPECIFICATION DOCUMENT | TEST SPECIFICATION A1 |
| ⋮ | ⋮ | ⋮ | ⋮ | ⋮ |

FIG.5

| CONDITION NUMBER | TYPE | CONDITION 1 | CONDITION 2 |
|---|---|---|---|
| P001 | FOLDER | FUNCTIONAL REQUIREMENTS | FUNCTIONAL DESIGN |
| P002 | FOLDER | FUNCTIONAL DESIGN | FUNCTIONAL DETAILED DESIGN |
| P003 | FOLDER | FUNCTIONAL DESIGN | FUNCTIONAL TEST SPECIFICATIONS |
| P004 | FOLDER | FUNCTIONAL REQUIREMENTS | REQUIREMENTS TEST SPECIFICATIONS |
| P005 | FILE | FUNCTION A DESIGN DOCUMENT | FUNCTION A1 DETAILED DESIGN DOCUMENT |
| P006 | FILE | FUNCTION A DESIGN DOCUMENT | FUNCTION A2 DETAILED DESIGN DOCUMENT |
| P007 | FILE | FUNCTION B DESIGN DOCUMENT | FUNCTION B1 DETAILED DESIGN DOCUMENT |
| P008 | ELEMENT | FUNCTION A1 DESIGN | FUNCTION A1 DETAILED DESIGN DOCUMENT |
| P009 | ELEMENT | FUNCTION A1 DESIGN | DETAILED DESIGN (a) |
| P010 | ELEMENT | FUNCTION A1 DESIGN | DETAILED DESIGN (b) |
| P011 | ELEMENT | FUNCTION B1 DESIGN | DETAILED DESIGN ($\alpha$) |
| P012 | ELEMENT | FUNCTIONAL REQUIREMENT 1 | TEST SPECIFICATION 1 |
| P013 | ELEMENT | FUNCTION A1 DESIGN | TEST SPECIFICATION A1 |
| ⋮ | ⋮ | ⋮ | ⋮ |

FIG.7

| OBJECT ID$_1$ | OBJECT ID$_2$ |
|---|---|
| object0002 | object0006 |
| object0002 | object0009 |
| object0002 | object0020 |
| object0003 | object0006 |
| object0003 | object0021 |
| object0004 | object0009 |
| object0006 | object0012 |
| object0006 | object0015 |
| object0006 | object0023 |
| object0007 | object0012 |
| object0007 | object0013 |
| object0007 | object0014 |
| object0007 | object0024 |
| object0008 | object0015 |
| object0008 | object0016 |
| object0010 | object0017 |
| object0010 | object0018 |
| object0010 | object0018 |
| ⋮ | ⋮ |

FIG.11

SEARCH SCREEN (220)

·DESIGNATION OF A FILE ELEMENT TO BE CHANGED·

FOLDER: FUNCTIONAL DESIGN ▼
- FUNCTIONAL REQUIREMENTS
- FUNCTIONAL DESIGN
- FUNCTIONAL DETAILED DESIGN
- NONE

FILE: FUNCTION A DESIGN DOCUMENT ▼
- FUNCTION A DESIGN DOCUMENT
- FUNCTIONAL DETAILED DESIGN
- NONE

FILE ELEMENT: FUNCTION A1 DESIGN ▼
- FUNCTION A1 DESIGN
- FUNCTION A2 DESIGN
- NONE

·DESIGNATION OF NUMBER OF RETRIEVALS·

NUMBER OF RETRIEVALS: 1 ▼
- 0
- 1
- 2
- ALL HIERARCHIES

·DESIGNATION OF GRANULARITY OF SEARCH RESULT·

GRANULARITY: FILE ▼
- FOLDER
- FILE
- FILE ELEMENT
- NONE

SEARCH (220A)   CANCEL (220B)

RECORDING MEDIUM, SEARCH METHOD, AND INFORMATION PROCESSING APPARATUS

CROSS-REFERENCE TO RELATED APPLICATIONS

This application is based upon and claims the benefit of priority of the prior Japanese Patent Application No. 2012-286155, filed on Dec. 27, 2012, the entire contents of which are incorporated herein by reference.

FIELD

The embodiments discussed herein are related to a search program, a search method, and an information processing apparatus.

BACKGROUND

In the design and development of a product, files of deliverables such as a specification document, a design document, and verification data generated in design and development processes are managed. Examples of such products include a control system and an embedded system, etc. used in the automotive industry, the electrical industry, and the precision industry, etc. When file management is performed in this way, interrelated files are associated with each other so that in case of any change in part of specification or design, the extent of influence of the change can be found. This file association is aimed at improving traceability.

Patent document 1: Japanese Laid-open Patent Publication No. 09-223008
Patent document 2: Japanese Laid-open Patent Publication No. 10-254691
Patent document 3: Japanese Laid-open Patent Publication No. 09-101884
Patent document 4: Japanese Laid-open Patent Publication No. 08-194610

However, as will be explained below, the above-described search for the extent of influence has a problem that it is naturally limited in narrowing the extent of influence. Namely, in the above-described search for the extent of influence, a series of associations are retrieved in all directions from a file to be changed. As a result, in the search for the extent of influence, a largely-unaffected file is vainly searched. In this manner, in the above-described search for the extent of influence, less-useful files are considerably contained in a search result, and therefore, the extent of influence identified as the search result is expanded.

SUMMARY

According to an aspect of an embodiment, a computer readable recording medium stores therein a search program that controls a search range in accordance with a subordinate relationship between pieces of information, and that causes a computer to execute a process. The process includes acquiring that acquires selection order of first information and second information and displaying that displays, according to the selection order, either a relationship that the first information is subordinate to the second information or a relationship that the second information is subordinate to the first information as a subordinate relationship to be set.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of object information;
FIG. 5 is a diagram illustrating an example of condition information;
FIG. 7 is a diagram illustrating an example of association information;
FIG. 11 is a diagram illustrating an example of a screen displayed on the client terminal.

DESCRIPTION OF EMBODIMENTS

Preferred embodiments will be explained with reference to accompanying drawings. Incidentally, these embodiments do not limit the scope of application. Furthermore, the embodiments can be arbitrarily combined within the scope which does not cause any contradiction in processing contents.

[a] First Embodiment

Figure 1:
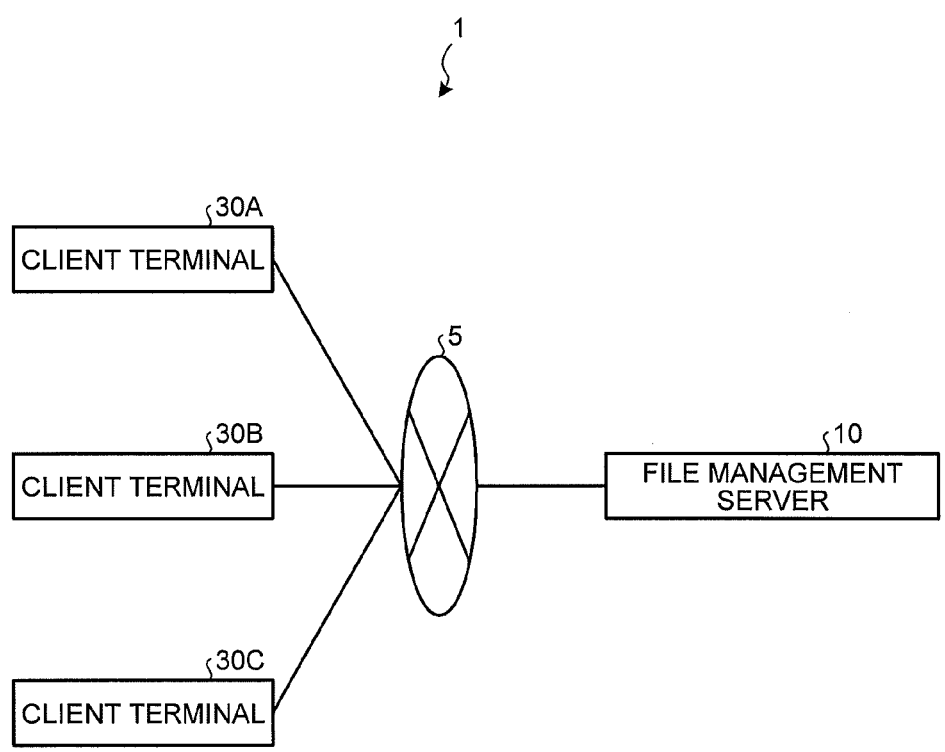
FIG. 1 is a diagram illustrating a configuration of a file management system according to a first embodiment.

System Configuration
FIG. 1 is a diagram illustrating a configuration of a file management system according to a first embodiment. A file management system 1 illustrated in FIG. 1 is for managing files of development assets such as a specification document, a design document, and verification data generated by client terminals 30A to 30C in design and development processes of a product.

As illustrated in FIG. 1, the file management system 1 includes a file management server 10 and the client terminals 30A to 30C. Incidentally, in FIG. 1, three client terminals are depicted; however, the file management system 1 can include any number of client terminals. Furthermore, FIG. 1 illustrates a case where one file management server manages files; however, multiple file management servers can manage files in a distributed manner. Hereinafter, the client terminals 30A to 30C may be collectively referred to as "the client terminal 30" when there is no distinction among them.

The file management server 10 and the client terminal 30 are connected through a network 5 so as to communicate with each other. Any kinds of communication networks regardless of whether wired or wireless, such as the Internet, a local area network (LAN), and a virtual private network (VPN), can be adopted as the network 5.

The file management server 10 is a computer that provides the client terminal 30 a search service for searching for the extent of influence of a change in product specification or design on another file. The file management server 10 can be implemented as a Web server which executes a process relating to the search service, and can be also implemented as a cloud which provides the search service by outsourcing. As another mode, the search service can be implemented by pre-installing or installing a search program provided as packaged software or online software on an intended computer.

The client terminal 30 is a computer that receives provision of the search service. For example, the client terminal 30 is used by developers who are engaged in the product development and design and people who are indirectly involved in the development and design, etc. Hereinafter, the developers and the people involved may be collectively referred to as "development-related person(s)". As forms of the client terminal 30, besides fixed terminals including a personal computer, mobile terminals such as a smartphone, a cellular phone, a personal handyphone system (PHS), and a personal digital assistant (PDA) can be adopted.

An application program working as a front-end which receives provision of the search service provided by the file management server 10, for example, a Web browser or the like is pre-installed or installed on the client terminal 30. Incidentally, hereinafter, an application program running on the client terminal 30 may be referred to as a "client app".

For example, the client terminal 30 receives input of login authentication information such as an account name or password of a development-related person through a client app, and transmits the login authentication information to the file management server 10. Hereby, login authentication of the development-related person is performed. As a result, when the login authentication has succeeded, i.e., when an operator of the client terminal 30 has been authenticated as a development-related person, the file management server 10 releases part or all of the search service in accordance with authority that the development-related person has. After the success of the login authentication, the client terminal 30 can receive various file operations on the file management server 10 from the development-related person through the client app.

Forms of the file operations include an operation to upload a new file on the file management server 10, an operation to change a part of contents of a file managed on the file management server 10, and an operation to delete a file, etc. Incidentally, hereinafter, document files of a specification document, a design document, and verification data, etc. created in the development and design processes of the product with word-processing software and spreadsheet software, etc. may be each referred to as a "document". As another form of the file operations, there is an association operation to associate multiple pieces of interrelated file information out of files managed on the file management server 10. The association is performed for the purpose of achieving traceability for searching for the extent of influence of, for example, a change in contents of a file on another file.

Incidentally, the term "file information" here does not always mean a file itself, and can be an element contained in a document that contents of the file represent. For example, in a case of a file of tabular data, file information can be a cell of a table displayed using spreadsheet software. Hereinafter, an element contained in a document that contents of a file represent, such as a cell in spreadsheet software, may be referred to as a "file element".

Configuration of the File Management Server 10

Figure 2:
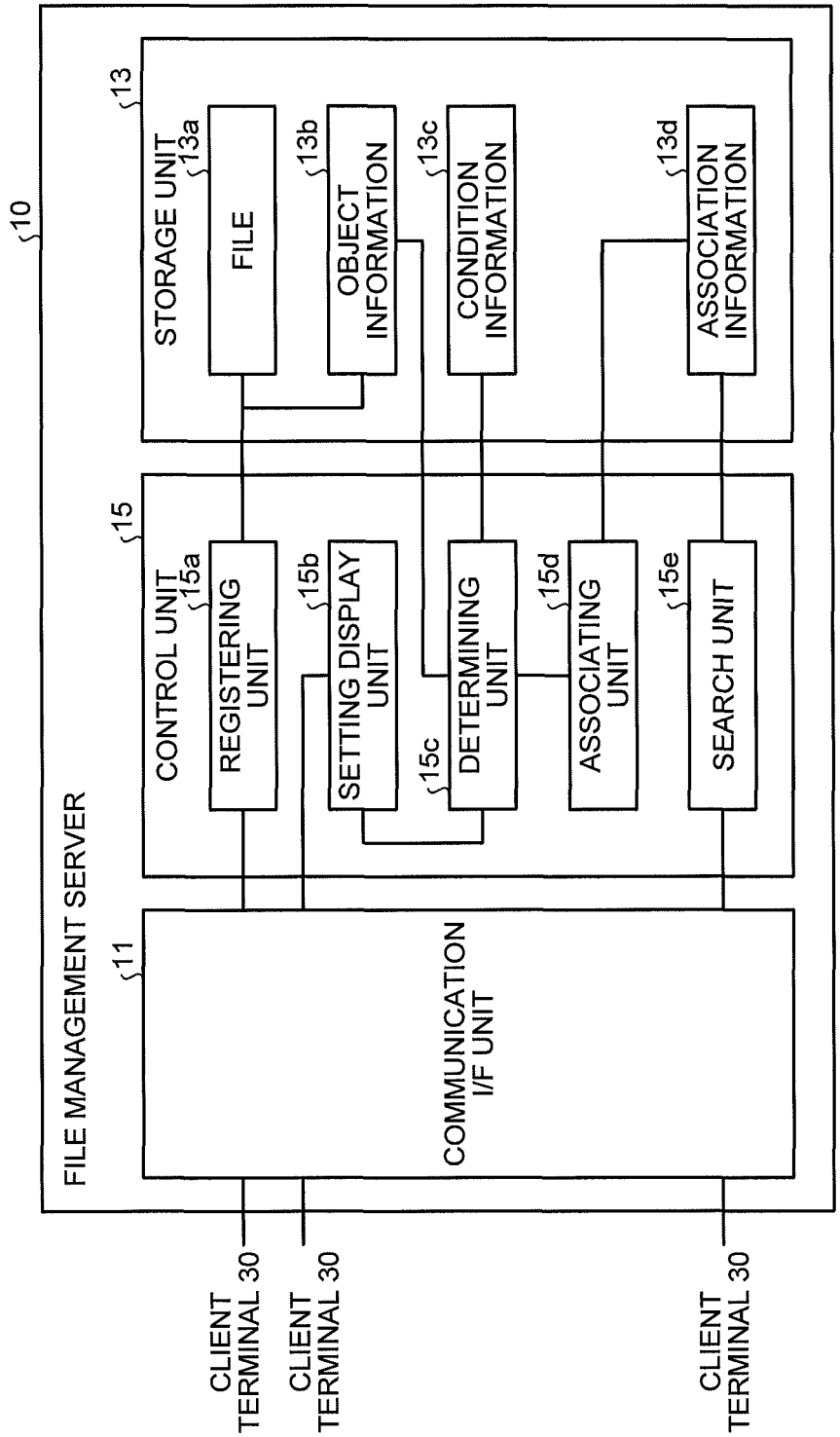
FIG. 2 is a block diagram illustrating a functional configuration of a file management server according to the first embodiment.

Subsequently, a functional configuration of the file management server 10 according to the present embodiment is explained. FIG. 2 is a block diagram illustrating the functional configuration of the file management server 10 according to the first embodiment. As illustrated in FIG. 2, the file management server 10 includes a communication interface (I/F) unit 11, a storage unit 13, and a control unit 15. Incidentally, besides the functional units illustrated in FIG. 2, the file management server 10 can include various functional units that a known server device has, for example, functional units such as an input device and a voice output device.

The communication I/F unit 11 is an interface that controls communication with another device such as the client terminal 30. As a form of the communication I/F unit 11, a network interface card, such as a local area network (LAN) card, can be adopted. For example, the communication I/F unit 11 receives a command relating to a file operation or a file corresponding to a command from the client terminal 30, and receives a request for a search for the extent of influence of a change in a file element on another file or another file element. Furthermore, the communication I/F unit 11 transmits a file corresponding to a file operation command from the client terminal 30, and transmits a result of the search for the extent of influence.

The storage unit 13 is a storage device that stores therein various programs, such as an operating system (OS) and a search program, which are executed by the control unit 15. Forms of the storage unit 13 include a semiconductor memory device, such as a flash memory, and a storage device, such as a hard disk or an optical disk. Incidentally, the storage unit 13 is not limited to the above-described types of storage devices, and can be a random access memory (RAM) or a read-only memory (ROM).

The storage unit 13 stores therein a file 13a, object information 13b, condition information 13c, and association information 13d as examples of data used in a program executed by the control unit 15. Incidentally, besides the file 13a, the object information 13b, the condition information 13c, and the association information 13d, other electronic data, such as file access authority of a development-related person, can be also stored in the storage unit 13.

The file 13a includes various files generated in the development and design processes of the product. As an example, the file 13a includes various documents generated in processes of requirements analysis, outline design, and detail design and various documents generated in a process of verification, i.e., test of a program programmed after the program design. To give concrete examples, the file 13a includes a "functional requirements document" in which specifications of functions of the product are defined as a result of the requirements analysis, a "functional design document" in which basic design of the functions of the product are defined as a result of the outline design, and a "functional detailed design document" in which detailed design of the functions of the product are defined as a result of the detail design, etc. Furthermore, the file 13a includes a "requirements test specifications document" in which a plan on a program test is formulated from a standpoint of requirements and a "functional test specifications document" in which a plan on a program test is formulated from a standpoint of functions, etc.

Figure 3:
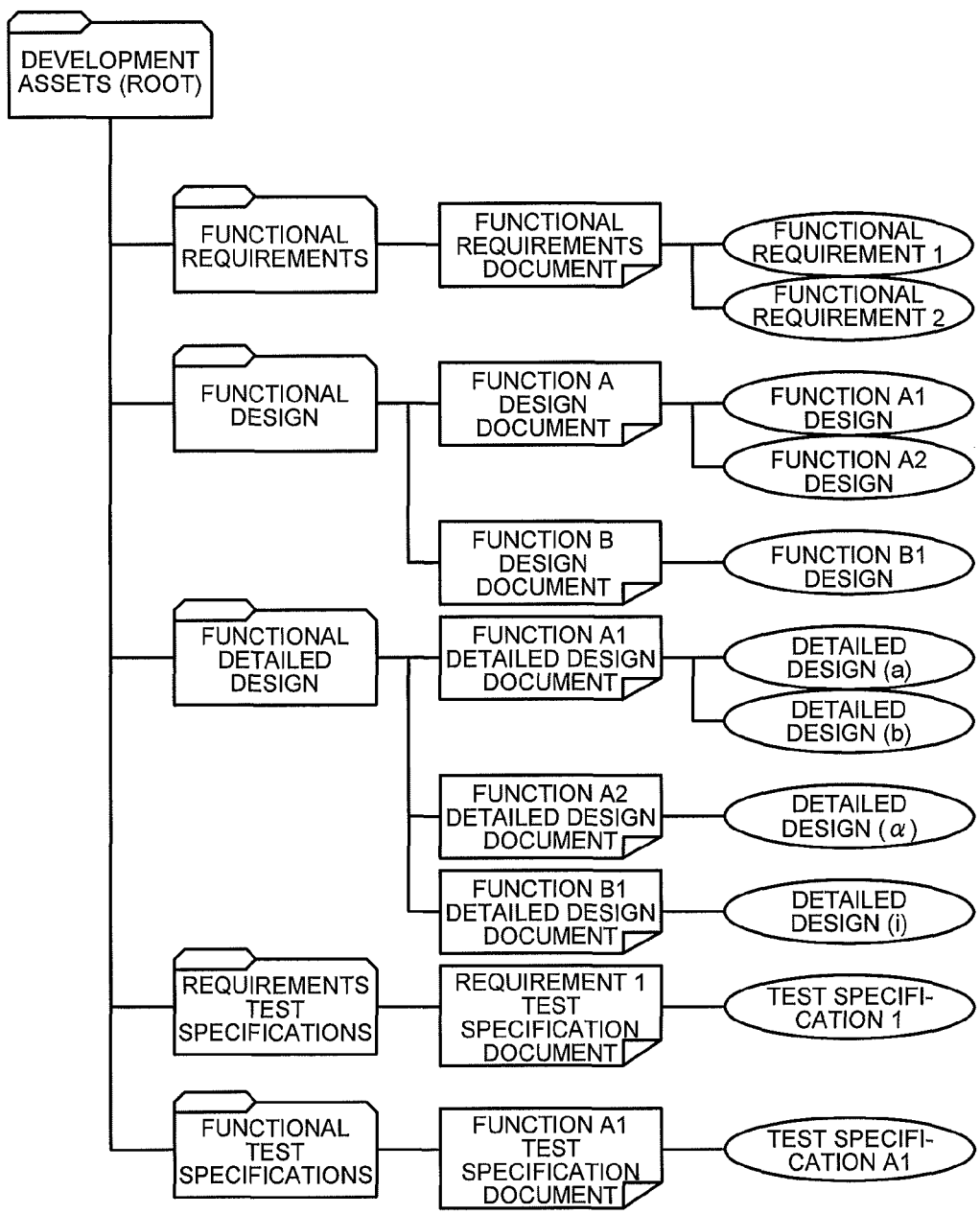
FIG. 3 is a diagram illustrating an example of a tree structure.

Displaying the file 13a on the client terminal 30 and manipulating the file 13a are implemented by a virtual tree structure. FIG. 3 is a diagram illustrating an example of the tree structure. FIG. 3 illustrates a tree structure in which a root folder is placed at the top thereof and folders of the development and design processes of the product, such as "functional requirements", "functional design", "functional detailed design", "requirements test specifications", and "functional test specifications", are placed under the root folder as subordinate folders.

As illustrated in FIG. 3, the "functional requirements" folder stores therein a "functional requirements document" file. The "functional requirements document" file contains file elements such as a "functional requirement 1" and a "functional requirement 2". Furthermore, the "functional design" folder stores therein two files: a "function A design document" file and a "function B design document" file. The "function A design document" file contains file elements such as "function A1 design" and "function A2 design"; the "function B design document" file contains a file element of "function B1 design". Moreover, the "functional detailed design" folder stores therein three files: a "function A1 detailed design document" file, a "function A2 detailed design document" file, and a "function B1 detailed design document" file. The "function A1 detailed design document" file contains file elements such as "detailed design (a)" and "detailed design (b)". The "function A2 detailed design document" file contains a file element of "detailed design (α)". The "function B1 detailed design document" file contains a file element of "detailed design (i)". Furthermore, the "requirements test specifications" folder stores therein a "requirement 1 test specification document" file, and the "requirement 1 test specification document" file contains "test specification 1" relating to the functional requirement 1. Moreover, the "functional test specifications" folder stores therein a "function A1 test specification document" file, and the "function A1 test specification document" file contains a "test specification A1" relating to a function A1.

The object information 13b is information on objects such as folders, files, and file elements subject to the above-described association. When a file operation from the client terminal 30 has been executed, the object information 13b is generated, updated, or deleted by a registering unit 15a to be described later.

For example, upon receipt of a file operation to newly create a folder on the file management server 10 from the client terminal 30, the newly-created folder is newly registered as an object. Furthermore, upon receipt of a file operation to newly upload a file from the client terminal 30, the newly-uploaded file is newly registered as an object. With this, a specific file element out of contents of the newly-uploaded file is extracted, and the file element is newly registered as an object. Moreover, upon receipt of a file operation to delete a folder on the file management server 10 from the client terminal 30, objects such as the folder corresponding to the received file operation, file(s) contained in the folder, and file element(s) contained in the file(s) are deleted. Furthermore, when a file operation to delete a file has been received, objects such as the file corresponding to the received file operation and file element(s) contained in the file are deleted. Moreover, upon receipt of a file operation to update a file on the file management server 10 from the client terminal 30, a specific file element out of contents of the file to be updated is re-extracted, and the file element is overwritten with a new object.

As a form of the object information 13b, data associated with items of "object identifier (ID)", "type", "folder", "file", and "file element", etc. can be adopted. The term "object ID" here means identification information for identifying an object; objects of folders, files, and file elements are assigned unique IDs so that for example, files in the same folder or file elements in the same file can be identified. The term "type" here means a type of an object; examples of type include folder, file, and file element, etc.

FIG. 4 is a diagram illustrating an example of the object information 13b. FIG. 4 illustrates respective objects of the folders, files, and file elements illustrated in FIG. 3. An object with object ID "object0001" illustrated in FIG. 4 indicates the "functional requirements" folder illustrated in FIG. 3. When an object is a folder like this, fields of file and file element are blank as illustrated in FIG. 4. Furthermore, an object with object ID "object0002" illustrated in FIG. 4 indicates the "functional requirements document" file illustrated in FIG. 3. When an object is a file like this, a field of file element is blank as illustrated in FIG. 4. Moreover, an object with object ID "object0003" illustrated in FIG. 4 indicates the file element "functional requirement 1" illustrated in FIG. 3. When an object is a file element like this, respective values are stored in fields of folder, file, and file element as illustrated in FIG. 4. Incidentally, a schema of the object information 13b illustrated in FIG. 4 is just an example, and is not limited to the example illustrated in FIG. 4. For example, instead of folder and file, a path indicating a storage location of a folder or a file can be stored.

The condition information 13c is information that defines a condition for association between objects. As an example, the condition information 13c can be a so-called whitelist which is a list of conditions for permission for association between two objects. Incidentally, in the following, there is described an example where the condition information 13c is a whitelist; however, the condition information 13c can be a blacklist.

The reason why a condition is set on the association between objects here is to prevent tenuously-related objects from being associated incorrectly. To achieve this, in the present embodiment, only a combination of objects having a subordinate relationship that one of two objects is subordinate to the other object is permitted to be associated. Examples of the subordinate relationship include the following.

For example, in the example illustrated in FIG. 3, when objects are seen at the granularity of folder, i.e., process, the functional design is made in accordance with the functional requirements document on the requirements analysis, which is called a functional specifications document; therefore, the functional design can be considered to be subordinate to the functional requirements. Likewise, the functional detailed design, i.e., detail design can be considered to be subordinate to the functional design; the requirements test specifications can be considered to be subordinate to the functional requirements; and the functional test specifications can be considered to be subordinate to the functional design.

Furthermore, in the example illustrated in FIG. 3, when objects are seen at the granularity of file, the detailed design of the functions A1 and A2 is made in accordance with the function A design document on the outline design of the function A1. Therefore, the function A1 detailed design document and the function A2 detailed design document can be considered to be subordinate to the function A design document. Likewise, the function B1 detailed design document can be considered to be subordinate to the function B design document; the requirement 1 test specification document can be considered to be subordinate to the functional requirements document; and the function A1 test specification document can be considered to be subordinate to the function A design document.

Moreover, in the example illustrated in FIG. 3, when objects are seen at the granularity of file element, the outline design of the function A1 is made in accordance with the functional requirement 1 defined in the functional requirements document; therefore, the function A design document can be considered to be subordinate to the functional requirement 1 which is a file element of the functional requirements document. Furthermore, the detailed design of the function A1 is made in accordance with the function A1 design defined in the function A design document; therefore, the function A1 detailed design document can be considered to be subordinate to the function A1 design. Just like this, the function A2 detailed design document can be considered to be subordinate to the function A2 design, and the function B1 detailed design document can be considered to be subordinate to the function B1 design. Likewise, the requirement 1 test specification document can be considered to be subordinate to the functional requirement 1, and the function A1 test specification document can be considered to be subordinate to the function A1 design. Furthermore, the test specification 1 can be considered to be subordinate to the functional requirement 1, and the test specification A1 can be considered to be subordinate to the function A1 design.

From these, conditions for combinations of objects having a subordinate relationship that one of the objects is subordinate to the other object are set in the condition information 13c.

As a form of the condition information 13c, data associated with items of "condition number", "type", "condition 1", and "condition 2", etc. can be adopted. The term "condition number" here means identification information for identifying a condition. The term "type" here means a type of a condition. As an example, there is a folder condition "folder" indicating that a condition of the granularity imposed on an object designated as a superior object to which one of two objects subjected to an association operation is subordinate is a folder. As another example, there is a file condition "file" indicating that a condition of the granularity imposed on a superior object is a file. As still another example, there is a file element condition "element" indicating that a condition of the granularity imposed on a superior object is a file element. Furthermore, the term "condition 1" here means a condition imposed on a superior object out of two objects subjected to an association operation, and the term "condition 2" here means a condition imposed on a subordinate object out of the two objects subjected to the association operation.

Figure 6:
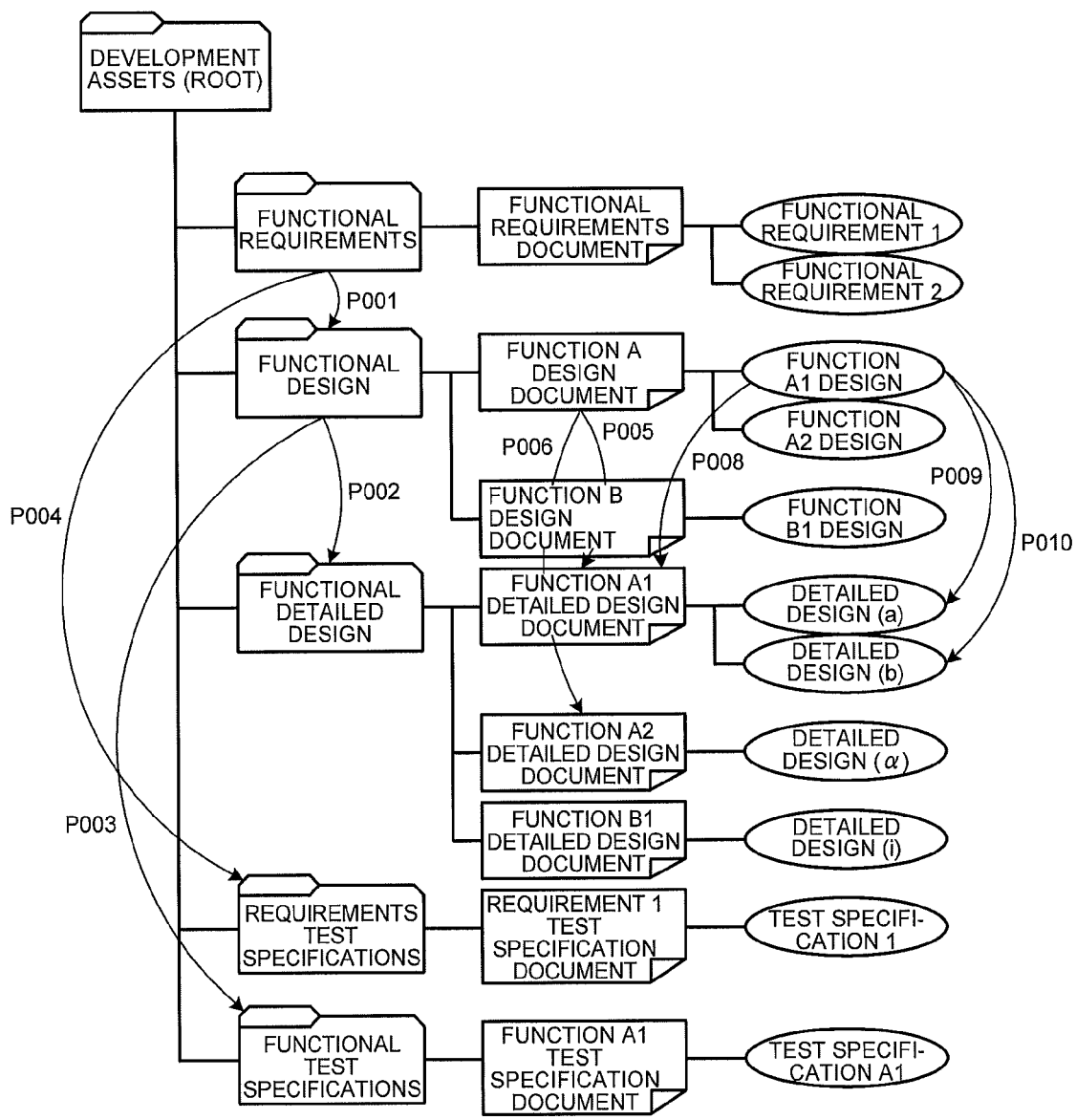
FIG. 6 is a diagram illustrating examples of folder conditions, file conditions, and file element conditions.

FIG. 5 is a diagram illustrating an example of the condition information 13c. FIG. 6 is a diagram illustrating examples of folder conditions, file conditions, and file element conditions. FIG. 5 illustrates folder conditions, file conditions, and file element conditions to be imposed when objects illustrated in FIG. 3 are associated. FIG. 6 illustrates a direction of arrow from a superior object to a subordinate object of each of the folder conditions, file conditions, and file element conditions illustrated in FIG. 5. Incidentally, in FIG. 6, out of the conditions illustrated in FIG. 5, conditions with condition numbers "P001" and "P004" which are folder conditions relating to the "functional requirements" folder, conditions with condition numbers "P002" and "P003" which are folder conditions relating to the "functional design" folder, conditions with condition numbers "P005" and "P006" which are file conditions relating to the "function A design document" file, and conditions with condition numbers "P008" to "P010" which are file element conditions relating to the "function A1 design" file element are selectively illustrated. Furthermore, in FIG. 6, the reason why a direction from a superior object to a subordinate object is indicated by an arrow is to make the direction accord with a direction in which the influence of a file element to be changed reaches toward an object of a process executed later than a process to which the file element belongs, i.e., a direction of searching for the extent of influence.

The conditions with condition numbers "P001" to "P004" illustrated in FIG. 5 are examples of folder conditions. For example, in the folder condition with condition number "P001" illustrated in FIG. 5, as illustrated in FIG. 6, requirements that a folder to which a superior object belongs is "functional requirements" and a folder to which a subordinate object belongs is "functional design" are set. Furthermore, in the folder condition with condition number "P002" illustrated in FIG. 5, as illustrated in FIG. 6, requirements that a folder to which a superior object belongs is "functional design" and a folder to which a subordinate object belongs is "functional detailed design" are set. Moreover, in the folder condition with condition number "P003" illustrated in FIG. 5, as illustrated in FIG. 6, requirements that a folder to which a superior object belongs is "functional design" and a folder to which a subordinate object belongs is "functional test specifications" are set. Furthermore, in the folder condition with condition number "P004" illustrated in FIG. 5, as illustrated in FIG. 6, requirements that a folder to which a superior object belongs is "functional requirements" and a folder to which a subordinate object belongs is "requirements test specifications" are set.

The conditions with condition numbers "P005" and "P006" illustrated in FIG. 5 are examples of file conditions. For example, in the file condition with condition number "P005" illustrated in FIG. 5, as illustrated in FIG. 6, requirements that a file containing a file or file element designated as a superior object out of two objects subjected to an association operation is "function A design document" and a file containing a file or file element designated as a subordinate object is "function A1 detailed design document" are set. Furthermore, in the file condition with condition number "P006" illustrated in FIG. 5, as illustrated in FIG. 6, requirements that a file containing a file or file element designated as a superior object is "function A design document" and a file containing a file or file element designated as a subordinate object is "function A2 detailed design document" are set. Incidentally, here, there are described the file conditions with condition numbers "P005" and "P006" as examples; however, this does not prohibit other file conditions besides these, including the condition with condition number "P007", from being set in the condition information 13c.

The conditions with condition numbers "P008" to "P010" illustrated in FIG. 5 are examples of file element conditions. For example, in the file element condition with condition number "P008" illustrated in FIG. 5, as illustrated in FIG. 6, requirements that a file element designated as a superior object out of two objects subjected to an association operation is "function A1 design" and a file designated as a subordinate object is "function A1 detailed design document" are set. Furthermore, in the file element condition with condition number "P009" illustrated in FIG. 5, as illustrated in FIG. 6, requirements that a file element designated as a superior object is "function A1 design" and a file element designated as a subordinate object is "detailed design (a)" are set. Moreover, in the file element condition with condition number "P010" illustrated in FIG. 5, as illustrated in FIG. 6, requirements that a file element designated as a superior object is "function A1 design" and a file element designated as a subordinate object is "detailed design (b)" are set. Incidentally, here, there are described the file element conditions with condition numbers "P008" to "P010" as examples; however, this does not prohibit other file element conditions besides these, including the conditions with condition numbers "P011" to "P013", from being set in the condition information 13c.

In the example of the condition information 13c illustrated in FIG. 5, there is described an example where when a superior object exactly matches a folder name, file name, or file element name set in "condition 1", and also a subordinate object exactly matches a folder name, file name, or file element name set in "condition 2", a combination of the objects is determined to meet a folder condition, a file condition, or a file element condition; alternatively, when two objects partially matches "condition 1" and "condition 2" respectively, a combination of the objects can be determined to meet a condition. For example, assume that the function A is set in condition 1 of a file element condition, and the function A1 is set in condition 2 of the file element condition. In this case, when an object having a partially-matched file element name with the condition 1 "function A" is designated as a superior, and an object having a partially-matched file element name or file name with the condition 2 "function A1" is designated as a subordinate, a combination of the objects is determined to meet a file element condition. Therefore, for example, when an association operation designating an object having the file element name "function A1 design" as a superior object and an object having the file name "function A1 detailed design document" as a subordinate object is performed, a combination of the objects is determined to meet a file element condition.

The association information 13d is information on association between multiple pieces of file information, i.e., association between objects. When a combination of superior and subordinate objects subjected to an association operation meets at least any one of the folder conditions, the file conditions, and the file element conditions, information on the combination of the superior and subordinate objects is added into the association information 13d by an associating unit 15d.

As a form of the association information 13d, items of "object $ID_1$" and "object $ID_2$" associated with each other can be adopted. The term "object $ID_1$" here means an object ID of a superior object out of a combination of objects, i.e., a "primary" object. Furthermore, the term "object $ID_2$" here means an object ID of a subordinate object out of a combination of objects, i.e., a "secondary" object.

FIG. 7 is a diagram illustrating an example of the association information 13d. FIG. 7 illustrates combinations of associated objects out of the objects illustrated in FIG. 3. For example, in a combination of object $ID_1$ "object0002" and object $ID_2$ "object0006" illustrated in FIG. 7, association, i.e., a relationship is set between the functional requirements document file and the function A design document file. This relationship means that the function A design document file is subordinate to the functional requirements document file. Furthermore, in a combination of object $ID_1$ "object0003" and object $ID_2$ "object0006" illustrated in FIG. 7, a relationship is set between the functional requirement 1 file element and the function A design document file. This relationship means that the function A design document file is subordinate to the functional requirement 1 file element. Moreover, in a combination of object $ID_1$ "object0003" and object $ID_2$ "object0021" illustrated in FIG. 7, a relationship is set between the functional requirement 1 file element and the test specification 1 file element. This relationship means that the test specification 1 file element is subordinate to the functional requirement 1 file element.

The control unit 15 has an internal memory for storing a program defining various processing procedures and control data, and executes various processes using these. As illustrated in FIG. 2, the control unit 15 includes the registering unit 15a, a setting display unit 15b, a determining unit 15c, the associating unit 15d, and a search unit 15e.

The registering unit 15a is a processing unit that registers a file received from the client terminal 30 in the storage unit 13. As one mode, when having received a file operation to newly upload a file from the client terminal 30, the registering unit 15a registers the newly-uploaded file in the storage unit 13. Furthermore, the registering unit 15a assigns an object ID to the newly-uploaded file, and adds the object ID and a type of the file into the association information 13d stored in the storage unit 13 in a manner associated with a name of the file and a name of a folder in which the file is stored. Moreover, the registering unit 15a extracts specific file elements, such as a file element representing a feature of the file, from contents of the newly-uploaded file. For example, pieces of information such as a number, a symbol, and a character string written in cells located in the same rows or columns as a given item are extracted as the specific file elements. Items to be extracted from the cells in this way can be set in accordance with contents of a document. For example, when file elements are extracted from the functional requirements document file, items of an identifier, a name, and a descriptive text which represent a feature of each analyzed functional requirement can be set. Then, the registering unit 15a assigns an object ID to each of the extracted file elements. After that, the registering unit 15a adds the object ID and a type of the file element into the object information 13b stored in the storage unit 13 in a manner associated with the name of the file from which the file element has been extracted and the name of the folder in which the source file has been stored.

As another mode, when having received a file operation to update a file on the file management server 10 from the client terminal 30, the registering unit 15a overwrites the file to be updated in the storage unit 13. Furthermore, the registering unit 15a re-extracts specific file elements from contents of the updated file. Then, the registering unit 15a assigns an object ID to a file element which does not match any file elements extracted before the update out of the re-extracted file elements. After that, the registering unit 15a adds the assigned object ID and a type of the file element into the object information 13b stored in the storage unit 13 in a manner associated with a name of the file element, a name of the file from which the file element has been re-extracted and a name of a folder in which the source file has been stored. At this time, the registering unit 15a deletes records of file elements, which have not been re-extracted out of the file elements extracted before the update, from the object information 13b stored in the storage unit 13.

The setting display unit 15b is a processing unit that selectively displays, as a subordinate relationship to be set, either a relationship that an object selected first is subordinate to an object selected subsequently or a relationship that the subsequently-selected object is subordinate to the first-selected object according to the selection order of two objects.

As one mode, when having received a drag operation on an object displayed on the client terminal 30, the setting display unit 15*b* starts processing. Subsequently, the setting display unit 15*b* receives a drop operation on another object different from the object from which the drag operation has started. Incidentally, in case the setting display unit 15*b* receives a drop operation on a place where the object subjected to the drag operation does not exist or a drop operation on the same object which has received the drag operation, an association operation is cancelled because only one object has been selected.

Then, the setting display unit 15*b* displays a subordinate relationship that the object subjected to the drop operation is subordinate to the object subjected to the drag operation as a candidate for association to set up on the client terminal 30. After that, if an operation to reverse the subordinate relationship has been made before the setting display unit 15*b* receives an operation to approve the subordinate relationship between the two objects displayed on the client terminal 30, the setting display unit 15*b* reverses the subordinate relationship between the two objects displayed on the client terminal 30. Then, when having received an operation to approve the subordinate relationship, the setting display unit 15*b* identifies the subordinate relationship displayed on the client terminal 30 at the time of the receipt of the approval operation as superior and subordinate objects. Consequently, an association operation on the superior object and the subordinate object has been accepted. Examples of a combination of objects subjected to an association operation include, for example, a combination of a file and a file, a combination of a file element and a file, and a combination of a file element and a file element. Incidentally, here, there is described the case where superior and subordinate objects are designated by an operation performed by a development-related person; alternatively, superior and subordinate objects can be automatically extracted.

In this manner, when a drag-and-drop operation to drag one of two objects as a start point of a drag operation and drop it on the other object as an end point of a drop operation is performed, the order of the object subjected to the drag operation and the object subjected to the drop operation is determined to be the selection order of two objects. Therefore, an operation to select two objects can be assigned to one action of clicking the left mouse button, so that the number of operations can be reduced. Furthermore, an operation to designate a subordinate relationship can be assigned to the mouse movement, and therefore the designation of a subordinate relationship can be performed intuitively.

Incidentally, here, from the standpoint of achieving operational feeling to match a moving direction of the mouse with the direction of searching for the extent of influence, there is described the case where an object subjected to a drop operation is subordinate to an object subjected to a drag operation; alternatively, from the standpoint of achieving operational feeling to match a moving direction of the mouse with a direction to which an object is subordinate, an object subjected to a drag operation can be subordinate to an object subjected to a drop operation.

Figure 8:
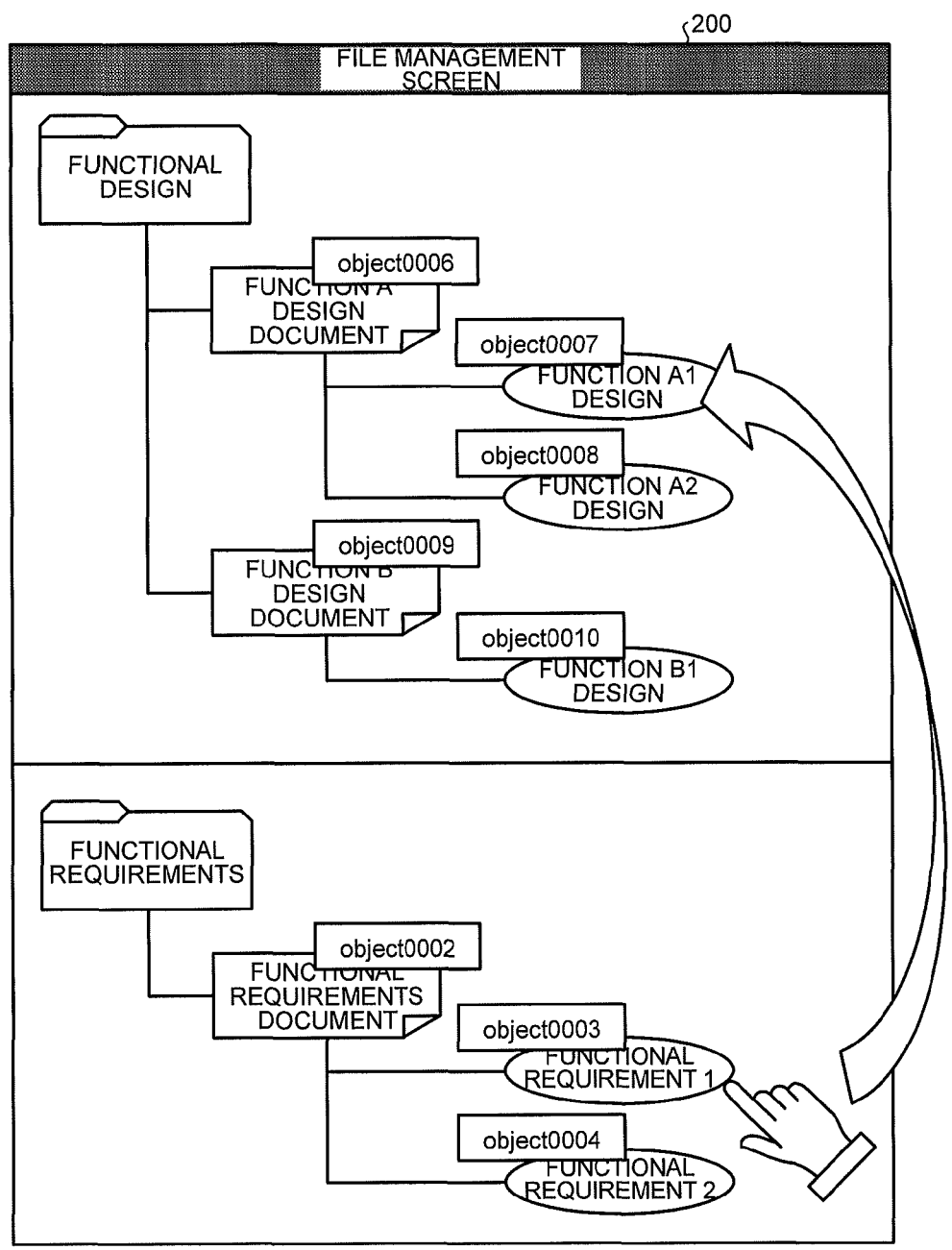
FIG. 8 is a diagram illustrating an example of a screen displayed on a client terminal.
Figure 9:
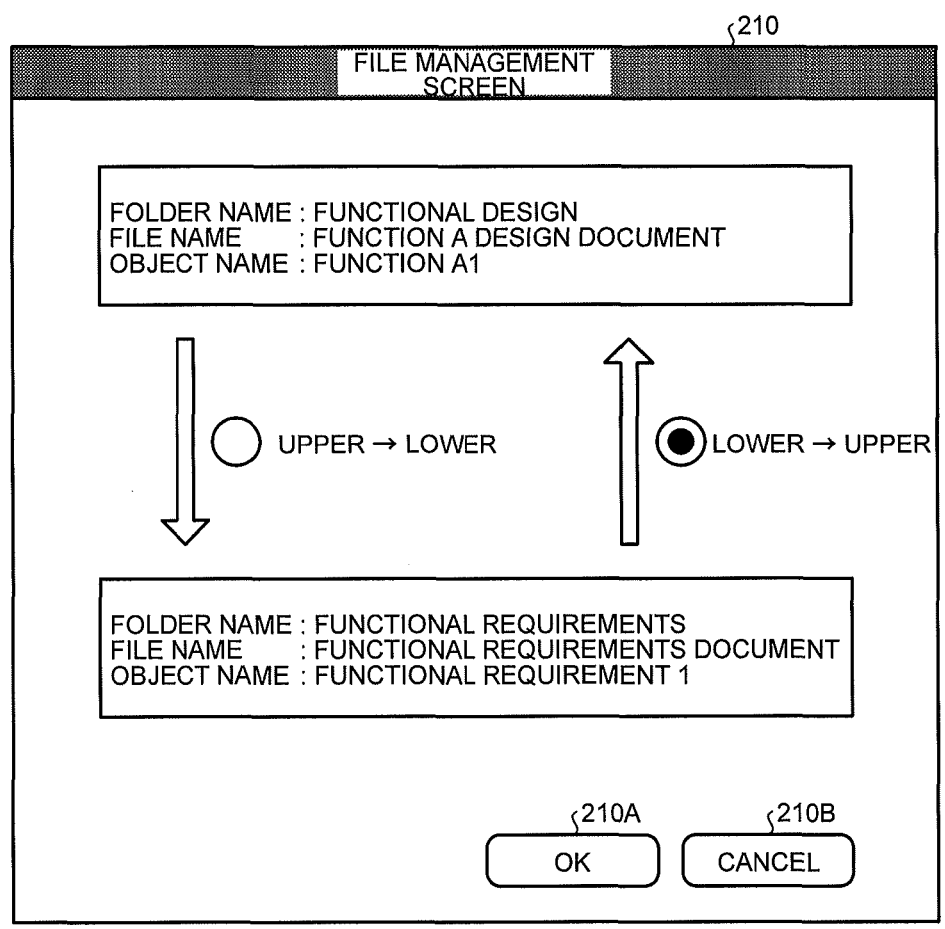
FIG. 9 is a diagram illustrating an example of a screen displayed on the client terminal.

FIGS. 8 and 9 are diagrams illustrating examples of screens displayed on the client terminal 30. FIGS. 8 and 9 illustrate file management screens 200 and 210 that the file management system 1 provides for management of files.

Incidentally, in the example illustrated in FIG. 8, the file management screen 200 is displayed on the client terminal 30 in a state where a window is divided into upper and lower sections; however, the screen does not necessarily have to be divided.

As illustrated in FIG. 8, upon receipt of a drag operation on the file element "functional requirement 1" displayed on the file management screen 200 and subsequently a drop operation on the file element "function A1 design" which is a different file element from the file element "functional requirement 1", a candidate subordinate relationship to set up is displayed as follows. As illustrated in FIG. 9, the file management screen 210 displays thereon a subordinate relationship in a direction from the "functional requirement 1" to the "function A1 design" which is the same direction as the drag operation in the upper direction, which means that the "function A1 design" subjected to the drop operation is subordinate to the "functional requirement 1" subjected to the drag operation is a candidate association operation to set up. Therefore, an operation to select the two file elements can be assigned to one action of clicking the left mouse button, so that the number of operations can be reduced. Furthermore, an operation to designate a subordinate relationship can be assigned to the mouse movement, and therefore the designation of a subordinate relationship can be performed intuitively. Moreover, a development-related person can reverse the currently-displayed subordinate relationship by clicking a radio button displayed on the file management screen 210. After that, when an OK button 210A displayed on the file management screen 210 is pressed, the subordinate relationship displayed on the file management screen 210 at the time when the OK button 210A was pressed is adopted. Namely, an operation for association between the superior file element "functional requirement 1" and the subordinate file element "function A1 design" has been accepted.

Incidentally, here, there is described the case where the left mouse button is used in a drag operation; alternatively, a drag operation can be performed in conjunction with a specific key on a keyboard, for example, a "Ctrl" key or a function key. Furthermore, a pointing device other than the mouse can be used in a drag-and-drop operation. Moreover, the selection order does not necessarily have to be determined by a drag-and-drop operation. For example, by receiving an operation to select one object and an operation to select the other object successively, a combination of the objects and a subordinate relationship can be designated in the same way.

The determining unit 15*c* is a processing unit that determines whether or not to permit an association operation with reference to the condition information 13*c* stored in the storage unit 13.

As one mode, when having received an association operation designating a superior object and a subordinate object, the determining unit 15*c* identifies respective folders to which the superior and subordinate objects of which the designation has been received by the setting display unit 15*b* belong with reference to the object information 13*b*. For example, when a designated object is a file, a folder name in a record containing a name of the file of which the designation has been received out of records included in the object information 13*b* is extracted. Furthermore, when a designated object is a file element, a folder name in a record containing a name of the file element of which the designation has been received out of records included in the object information 13*b* is extracted.

Then, the determining unit 15c determines whether the folder to which the superior object belongs and the folder to which the subordinate object belongs meet any of the folder conditions set in the condition information 13c. For example, when a folder name of the folder in which a file designated as the superior object has been stored or a folder name of the folder in which a file containing a file element designated as the superior object has been stored exactly matches a folder name set in condition 1 included in any of the folder conditions illustrated in FIG. 5, and also a folder name of the folder in which a file designated as the subordinate object has been stored or a folder name of the folder in which a file containing a file element designated as the subordinate object has been stored exactly matches a folder name set in condition 2 included in the same folder condition illustrated in FIG. 5, the determining unit 15c determines that a combination of the objects subjected to the association operation meets the folder condition. Depending on whether or not to meet any folder conditions, whether the superior object and the subordinate object have a subordinate relationship at the granularity of "folder" can be confirmed. At this time, when the folder to which the superior object belongs and the folder to which the subordinate object belongs do not meet any of the folder conditions set in the condition information 13c, it can be presumed that the superior object and the subordinate object are likely to be a wrong combination of objects which are not in a subordinate relationship. In this case, the determining unit 15c prohibits association between the combination of the objects subjected to the association operation.

On the other hand, when the folder to which the superior object belongs and the folder to which the subordinate object belongs meet any of the folder conditions set in the condition information 13c, whether or not to meet any file conditions is determined as follows. Namely, the determining unit 15c determines whether a file corresponding to the superior object and a file corresponding to the subordinate object meet any of the file conditions set in the condition information 13c. For example, when a file name of a file designated as the superior object or a file name of a file containing a file element designated as the superior object exactly matches a file name set in condition 1 included in any of the file conditions illustrated in FIG. 5, and also a file name of a file designated as the subordinate object or a file name of a file containing a file element designated as the subordinate object exactly matches a file name set in condition 2 included in the same file condition illustrated in FIG. 5, the determining unit 15c determines that the combination of the objects subjected to the association operation meets the file condition. Depending on whether or not to meet any file conditions, whether the superior object and the subordinate object have a subordinate relationship at the granularity of "file" can be confirmed.

At this time, when the file corresponding to the superior object and the file corresponding to the subordinate object do not meet any of the file conditions set in the condition information 13c, it can be presumed that the superior object and the subordinate object are likely to be a wrong combination of objects which are not in a subordinate relationship. In this case, the determining unit 15c prohibits association between the combination of the objects subjected to the association operation.

On the other hand, when the file corresponding to the superior object and the file corresponding to the subordinate object meet any of the file conditions set in the condition information 13c, the determining unit 15c determines whether the granularity of the object designated as a superior is a file element. At this time, when the granularity of the superior object is not a file element but a file, it can be confirmed that the combination of the objects subjected to the association operation is a file and a file. In this case, there is no need to determine whether or not to meet any file element conditions of which the granularity is finer than file. Therefore, the determining unit 15c permits association between the combination of the objects subjected to the association operation.

Furthermore, when the granularity of the object designated as a superior is a file element, it is determined that the combination of the objects subjected to the association operation is either a combination of a file element and a file or a combination of a file element and a file element. In this case, the determination of a file element condition is pursued. Namely, the determining unit 15c determines whether a file element corresponding to the superior object and a file or file element corresponding to the subordinate object meet any of the file element conditions set in the condition information 13c. For example, when a file element name of a file element designated as the superior object exactly matches a file element name set in condition 1 included in any of the file element conditions illustrated in FIG. 5, and also a file name of a file designated as the subordinate object or a file element name of a file element designated as the subordinate object exactly matches a file name or file element name set in condition 2 included in the same file element condition illustrated in FIG. 5, the determining unit 15c determines that the combination of the objects subjected to the association operation meets the file element condition. Depending on whether or not to meet any file element conditions, whether the superior object and the subordinate object have a subordinate relationship at the granularity of "file element" can be confirmed.

At this time, when the file element corresponding to the superior object and the file or file element corresponding to the subordinate object do not meet any of the file element conditions set in the condition information 13c, it can be presumed that the superior object and the subordinate object are likely to be a wrong combination of objects which are not in a subordinate relationship. In this case, the determining unit 15c prohibits association between the combination of the objects subjected to the association operation. On the other hand, when the file element corresponding to the superior object and the file or file element corresponding to the subordinate object meet any of the file element conditions set in the condition information 13c, it can be determined that confirmation of a subordinate relationship has been completed at all the granularities of folder, file, and file element. In this case, the determining unit 15c permits association between the combination of the objects subjected to the association operation.

Incidentally, here, there is described the case where whether to permit or prohibit association is determined by using a folder condition, a file condition, and a file element condition; alternatively, these conditions can be narrowed down to at least any one of a folder condition, a file condition, and a file element condition, and whether a combination of objects meets the condition(s) can be determined. For example, when a combination of objects subjected to an association operation meets a folder condition, the determining unit 15c can permit association between the combination of objects. Furthermore, when a combination of objects subjected to an association operation meets a file condition, the determining unit 15c can permit association between the combination of objects. Moreover, when a combination of objects subjected to an association operation meets a file element condition, the determining unit 15c can permit association between the combination of objects.

The associating unit 15d is a processing unit that executes association between objects. As one mode, when association has been permitted by the determining unit 15c, the associating unit 15d adds information on the associated superior and subordinate objects into the association information 13d. At this time, the associating unit 15d stores the superior object in a field of object $ID_1$ out of fields included in the association information 13d, and stores the subordinate object in a field of object $ID_2$.

Figure 10:
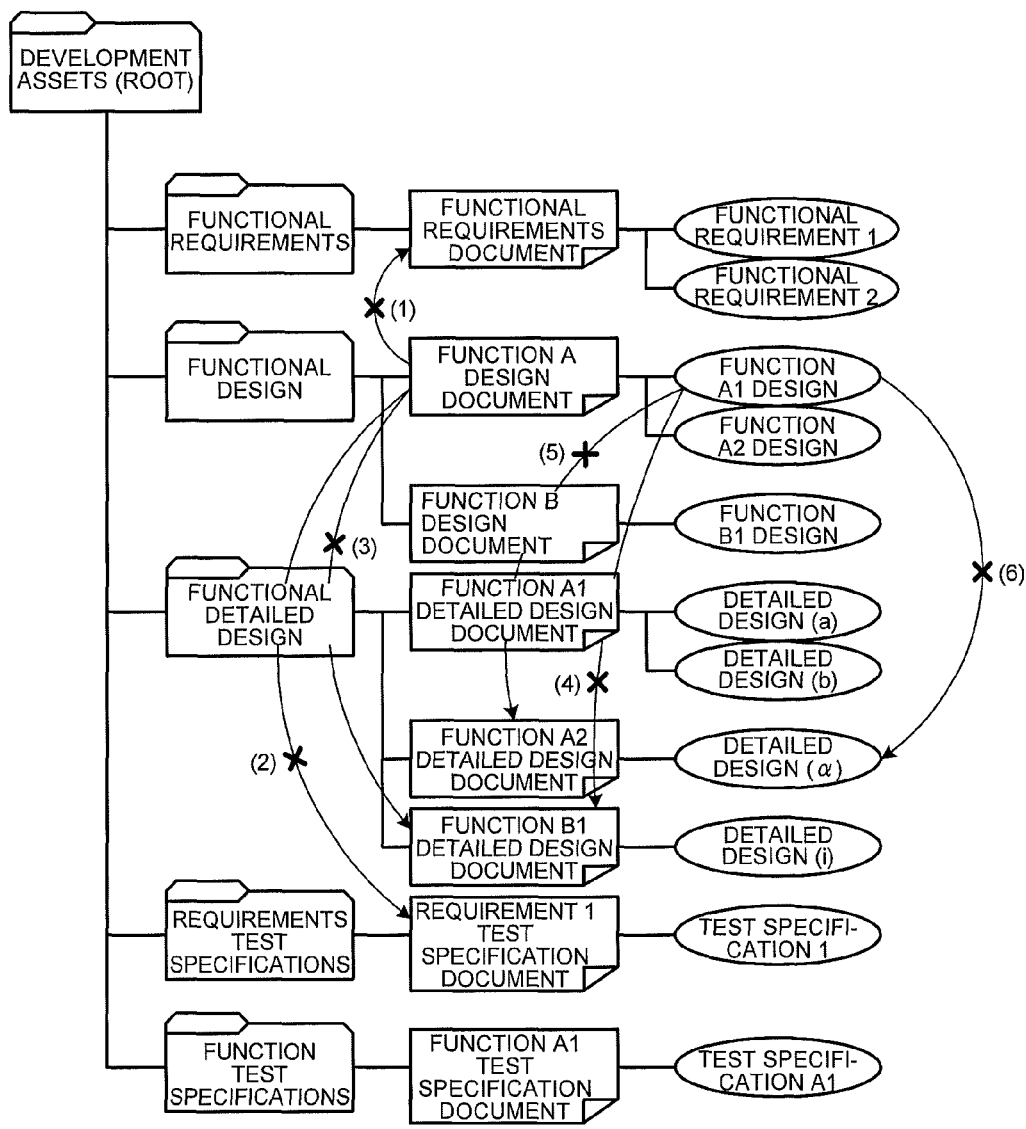
FIG. 10 is a diagram illustrating examples of cases where association is prohibited.

Here, concrete examples of cases where association is prohibited are explained with FIG. 10. FIG. 10 is a diagram illustrating examples of the cases where association is prohibited. FIG. 10 illustrates an association operation on a combination of objects which does not meet any folder conditions set in the condition information 13c illustrated in FIG. 5, an association operation on a combination of objects which does not meet any file conditions, and an association operation on a combination of objects which does not meet any file element conditions.

For example, assume that the "function A design document" file is designated as a superior object. Here, a folder condition does not permit an association operation designating an object generated in a process, which has been performed before an object designated as a superior, as a subordinate. Therefore, as indicated by an arrow (1) illustrated in FIG. 10, an association operation to associate with the functional requirements document generated in the requirements analysis process, which is a process performed before the outline design process in which the function A design document is generated, as a subordinate object does not meet the folder condition. Accordingly, association of the function A design document with the functional requirements document is prohibited. Furthermore, a folder condition does not permit an association operation designating an object generated in a process, which has been performed even after an object designated as a superior but bears no subordinate relationship to the superior object and is tenuously related to the superior object, as a subordinate. Therefore, as indicated by an arrow (2) illustrated in FIG. 10, an association operation designating the requirement 1 test specification document as a subordinate object does not meet the folder condition, and association of the function A design document with the requirements test specifications document is prohibited.

Furthermore, assume that the "function A design document" file is designated as a superior object. Here, a file condition does not permit an association operation to associate objects such that a function of one file is not included in a function of the other file. Therefore, as indicated by an arrow (3) illustrated in FIG. 10, an association operation designating the function B1 detailed design document on the detailed design of the function B1 design, which is not included in the function A design document, as a subordinate object does not meet the file condition, and association of the function A design document with the function B1 detailed design document is prohibited.

Moreover, assume that the "function A1 design" file element is designated as a superior object. Here, a file element condition does not permit an association operation to associate objects which do not have the same function. Therefore, as indicated by an arrow (4) illustrated in FIG. 10, an association operation designating the function B1 detailed design document on the detailed design of the function B1, which belongs to the function B that is a different kind from the function A1 of the function A1 design designated as a superior, as a subordinate object does not meet the file element condition, and association of the function A1 design with the function B1 detailed design document is prohibited. Furthermore, as indicated by arrows (5) and (6) illustrated in FIG. 10, even if the function A2 detailed design document on the detailed design of the function A2, which belongs to the function A that is the same kind as the function A1 of the function A1 design designated as a superior, is designated as a subordinate object, respective functions of the superior and subordinate objects are similar, but are not the same. Therefore, association operations designating any of the function A2 detailed design document and the detailed design (α) defined in the function A2 detailed design document as a subordinate object does not meet the file element condition. Accordingly, association of the function A1 design with the function A2 detailed design document and the detailed design (α) is prohibited.

To return to the explanation of FIG. 2, the search unit 15e is a processing unit that searches for the extent of influence of a change in a file element on another file with reference to the association information 13d. As one mode, the search unit 15e receives designation of a file element to be changed from the client terminal 30. Then, the search unit 15e retrieves a subordinate object combined with the designated file element as its superior in object $ID_1$ in the example illustrated in FIG. 7 out of those included in the association information 13d. After that, the search unit 15e repeatedly performs the following process until the search unit 15e has completed a predetermined number of retrievals. Namely, the search unit 15e retrieves a combination of objects having the last-retrieved subordinate object as a superior object with reference to the association information 13d. Then, the search unit 15e identifies a subordinate object out of the retrieved combination of objects. Then, after having completed a predetermined number of retrievals, the search unit 15e outputs the objects obtained from the retrievals as a result of the search for the extent of influence to the client terminal 30. At this time, the search unit 15e can output the objects obtained from the retrievals in accordance with a predetermined granularity. For example, when a file has been set as the granularity of an object output as a result of the search for the extent of influence, out of the objects obtained from the retrievals, a file is directly output as a result of the search for the extent of influence, whereas as for a file element, instead of the file element, a file containing the file element can be output as a result of the search for the extent of influence.

Figure 12:
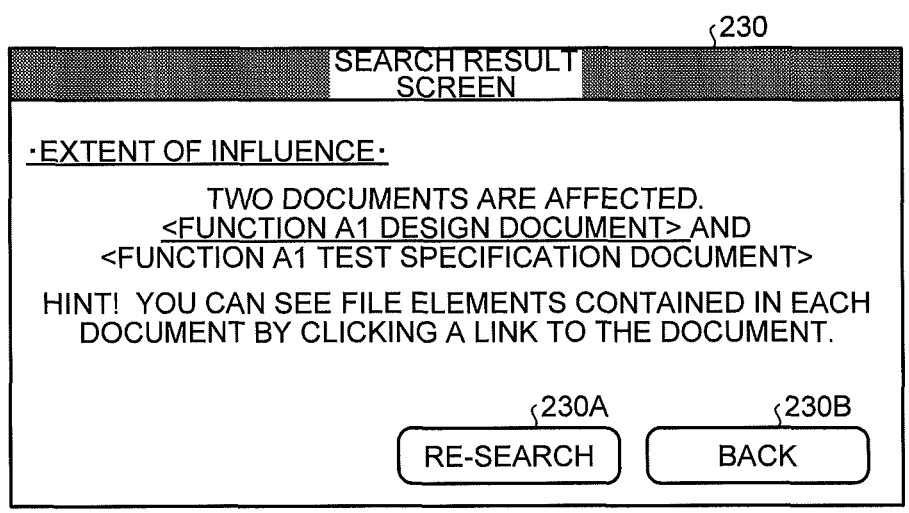
FIG. 12 is a diagram illustrating an example of a screen displayed on the client terminal.

FIGS. 11 and 12 are diagrams illustrating examples of screens displayed on the client terminal 30. FIG. 11 illustrates a search screen 220 to which various search conditions can be input. FIG. 12 illustrates a search result screen 230 containing a result of search for the extent of influence when search conditions illustrated in FIG. 11 were input. The search screen 220 illustrated in FIG. 11 includes pull-down menus of folders, files, and file elements. Therefore, a development-related person can designate a file element to be changed by operating the pull-down menus of folders, files, and file elements in this order. Besides these, the search screen 220 includes pull-down menus of the "number of retrievals" and the "granularity of an object to be output as a result of search for the extent of influence", and can receive the number of retrievals and the granularity together with a file element to be changed.

As illustrated in FIG. 11, when a SEARCH button 220A is pressed in a state where the "function A1 design" as a file element to be changed, "1" as the number of retrievals, and "file" as the granularity have been selected on the search screen 220, the following retrieval is executed with reference to the association information 13d illustrated in FIG. 7. Namely, object $ID_2$ "object0012", "object0013", "object0014", and "object0024", which are combined with object $ID_1$ of the designated "function A1 design" file element, i.e., object $ID_1$ "object0007" included in the association information 13d, are retrieved. In the example illustrated in FIG. 11, the designated number of retrievals is one time, so the retrieval is terminated this time only, i.e., only once. Incidentally, when a CANCEL button 220B is pressed, the retrieval is cancelled, and then the screen display of the client terminal 30 is transitioned to the last-viewed screen or the top screen for the development and design of the product, etc.

Out of the object IDs "object0012", "object0013", "object0014", and "object0024" obtained from the retrieval, the object IDs "object0013" and "object0014" correspond to the detailed design (a) and the detailed design (b), respectively. Furthermore, the object ID "object0024" corresponds to the test specification A1. These object IDs "object0013", "object0014", and "object0024" are IDs of file elements. In the example illustrated in FIG. 11, "file" is designated as the granularity, so the "function A1 detailed design document" file containing file elements with the object IDs "object0013" and "object0014" is extracted instead of the detailed design (a) and the detailed design (b). Furthermore, the "function A1 test specification document" file containing a file element with the object ID "object0024" is extracted instead of the test specification A1. Incidentally, here, the object "function A1 detailed design document" with the object ID "object0012" has been retrieved, and therefore the further extraction need not be performed. Incidentally, for example, when a file element is output as a search result, each file element which bears a relationship to the file element can be displayed on the search result screen 230. Furthermore, for example, when a file is output as a search result, a file containing each file element which bears a relationship to the file element can be displayed on the search result screen 230. The output of a search result can be configured to be user settable.

In addition, two documents of the function A1 detailed design document corresponding to the object ID "object0012" and the function A1 test specification document corresponding to the object ID "object0024" are displayed on the search result screen 230 as illustrated in FIG. 12. This display enables a development-related person to grasp that if a change is made to a file element of the function A1 design, the change affects the function A1 detailed design document and the function A1 test specification document. Furthermore, when only the file-based association is performed like in the conventional technology described above, the function A2 detailed design document unrelated to the function A1 design is also output as a result of the search for the extent of influence. On the other hand, in the present embodiment, the search is performed using the association information 13d on association in units of file elements; therefore, it is possible to avoid outputting the function A2 detailed design document unrelated to the function A1 design, and as a result, it is possible to improve the accuracy of traceability.

After that, when a RE-SEARCH button 230A on the search result screen 230 is pressed, the screen display of the client terminal 30 is again transitioned to the search screen 220 illustrated in FIG. 11, and a "file element to be changed", the "number of retrievals", or the "granularity of an object to be output as a result of search for the extent of influence" is re-designated, and then a re-search is performed. On the other hand, when a BACK button 230B on the search result screen 230 is pressed, the screen display of the client terminal 30 is transitioned to the last-viewed screen or the top screen for the development and design of the product, etc.

Incidentally, various integrated circuits and electronic circuits can be adopted as the control unit 15. Furthermore, some of the functional units included in the control unit 15 can be made up of another integrated circuits or electronic circuit. For example, the integrated circuits include an application specific integrated circuit (ASIC). Furthermore, the electronic circuits include a central processing unit (CPU) and a micro processing unit (MPU), etc.

Flow of Processing

Subsequently, the flow of processing by the file management server according to the present embodiment is explained. Incidentally, here, an association process performed by the file management server 10 is explained first, and after that, a search process is explained.

(1) Association Process

Figure 13:
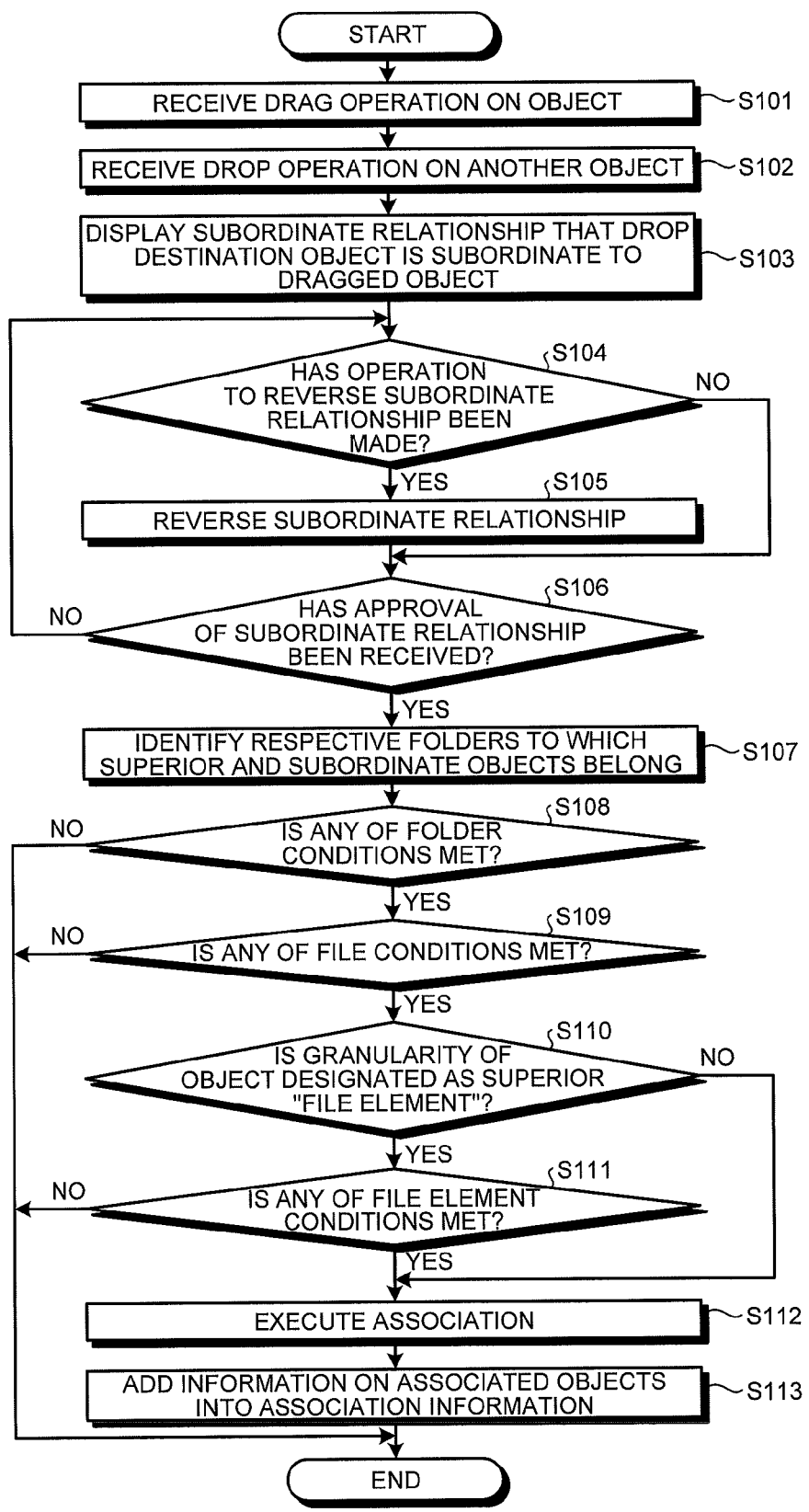
FIG. 13 is a flowchart illustrating a procedure of an association process according to the first embodiment.

FIG. 13 is a flowchart illustrating a procedure of the association process according to the first embodiment. This association process is started upon receipt of a drag operation on an object displayed on the client terminal 30.

As illustrated in FIG. 13, when having received a drag operation on an object (Step S101), the setting display unit 15b subsequently receives a drop operation on another object different from the object from which the drag operation has started (Step S102).

Then, the setting display unit 15b displays a subordinate relationship that the object subjected to the drop operation is subordinate to the object subjected to the drag operation as a candidate for association to set up on the client terminal 30 (Step S103).

After that, the setting display unit 15b determines whether the setting display unit 15b has received an operation to reverse the subordinate relationship (Step S104). At this time, when an operation to reverse the subordinate relationship has been made (YES at Step S104), the setting display unit 15b reverses the subordinate relationship between the two objects displayed on the client terminal 30 (Step S105). Incidentally, when no operation to reverse the subordinate relationship has been made (NO at Step S104), the process skips Step S105 and moves onto Step S106.

Then, until the setting display unit 15b has received an operation to approve the subordinate relationship between the two objects displayed on the client terminal 30 (NO at Step S106), the processes at Steps S104 and S105 are repeatedly performed.

After that, when the setting display unit 15b has received an operation to approve the subordinate relationship (YES at Step S106), the subordinate relationship displayed on the client terminal 30 at the time of the receipt of the approval operation is identified as superior and subordinate objects. Consequently, an association operation on the superior object and the subordinate object has been accepted.

Then, the determining unit 15c identifies respective folders to which the identified superior and subordinate objects belong with reference to the object information 13b (Step S107).

And then, the determining unit 15c determines whether the folder to which the superior object belongs and the folder to which the subordinate object belongs meet any of the folder conditions set in the condition information 13c (Step S108).

Here, when the folder to which the superior object belongs and the folder to which the subordinate object belongs do not meet any of the folder conditions set in the condition information 13c (NO at Step S108), it can be presumed that the superior object and the subordinate object are likely to be a wrong combination of objects which are not in a subordinate relationship. In this case, association between a combination of the objects subjected to the association operation is not performed, and the process is terminated.

On the other hand, when the folder to which the superior object belongs and the folder to which the subordinate object belongs meet any of the folder conditions set in the condition information 13c (YES at Step S108), the determining unit 15c determines whether the combination of the objects meets any file conditions as follows. Namely, the determining unit 15c determines whether a file corresponding to the superior object and a file corresponding to the subordinate object meet any of the file conditions set in the condition information 13c (Step S109).

At this time, when the file corresponding to the superior object and the file corresponding to the subordinate object do not meet any of the file conditions set in the condition information 13c (NO at Step S109), it can be presumed that the superior object and the subordinate object are likely to be a wrong combination of objects which are not in a subordinate relationship. In this case, association between the combination of the objects subjected to the association operation is not performed, and the process is terminated.

On the other hand, when the file corresponding to the superior object and the file corresponding to the subordinate object meet any of the file conditions set in the condition information 13c (YES at Step S109), the determining unit 15c determines whether the granularity of the object designated as a superior is a file element (Step S110).

At this time, when the granularity is not a file element (NO at Step S110), it can be confirmed that the combination of the objects subjected to the association operation is a file and a file. In this case, there is no need to determine whether or not to meet any file element conditions of which the granularity is finer than file. Therefore, association between the combination of the objects subjected to the association operation is permitted, and the process moves onto Step S112.

Furthermore, when the granularity of the object designated as a superior is a file element (YES at Step S110), it is determined that the combination of the objects subjected to the association operation is either a combination of a file element and a file or a combination of a file element and a file element.

In this case, the determination of a file element condition is pursued. Namely, the determining unit 15c determines whether a file element corresponding to the superior object and a file or file element corresponding to the subordinate object meet any of the file element conditions set in the condition information 13c (Step S111).

Here, when the file element corresponding to the superior object and the file or file element corresponding to the subordinate object do not meet any of the file element conditions set in the condition information 13c (NO at Step S111), it can be presumed that the superior object and the subordinate object are likely to be a wrong combination of objects which are not in a subordinate relationship. In this case, association between the combination of the objects subjected to the association operation is not performed, and the process is terminated.

On the other hand, when the file element corresponding to the superior object and the file or file element corresponding to the subordinate object meet any of the file element conditions set in the condition information 13c (YES at Step S111), association between the combination of the objects subjected to the association operation is permitted. In this case, the associating unit 15d associates the subordinate object with the superior object (Step S112), and adds information on the associated objects into the association information 13d (Step S113), and then the association process is terminated.

(2) Search Process

Figure 14:
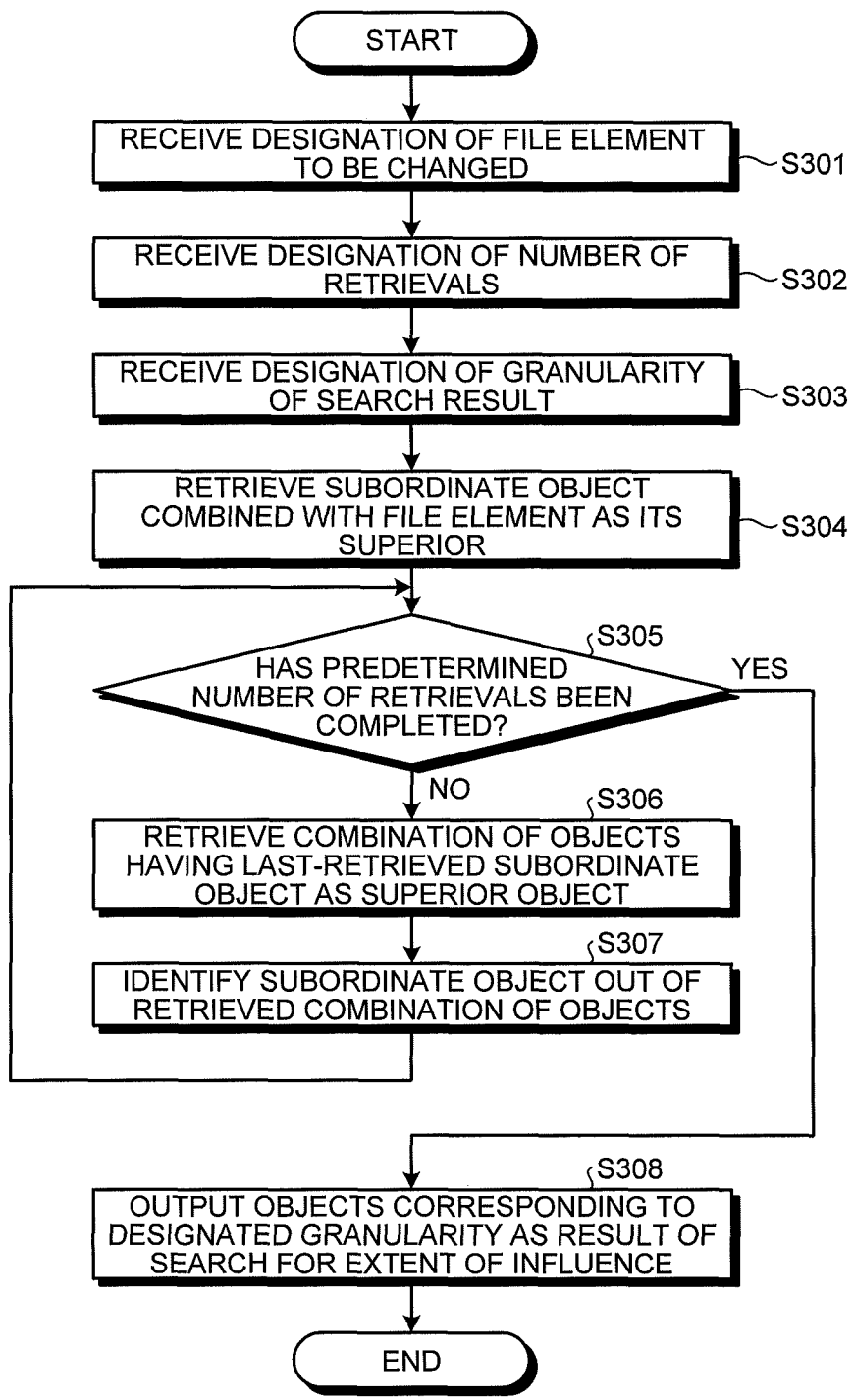
FIG. 14 is a flowchart illustrating a procedure of a search process according to the first embodiment.

FIG. 14 is a flowchart illustrating a procedure of the search process according to the first embodiment. This search process is started upon receipt of a search request from the client terminal 30. As illustrated in FIG. 14, the search unit 15e receives designation of a "file element to be changed", the "number of retrievals" and the "granularity of an object to be output as a result of search for the extent of influence" through the search screen displayed on the client terminal 30 (Steps S301 to S303).

Then, the search unit 15e retrieves a subordinate object combined with the designated file element as its superior with reference to the association information 13d (Step S304).

After that, the search unit 15e repeatedly performs the following process until the search unit 15e has completed a predetermined number of retrievals (NO at Step S305). Namely, the search unit 15e retrieves a combination of objects having the last-retrieved subordinate object as a superior object as with reference to the association information 13d (Step S306). Then, the search unit 15e identifies a subordinate object out of the retrieved combination of objects (Step S307).

Then, after having completed a predetermined number of retrievals (YES at Step S305), the search unit 15e converts the objects obtained from the retrievals into the granularity designated at Step S303, and outputs the converted objects as a result of the search for the extent of influence to the client terminal 30 (Step S308), and then the search process is terminated.

Incidentally, the processes at Steps S301 to S303 illustrated in FIG. 14 can be permuted in random order, and also can be executed in parallel. Furthermore, the processes at Steps S302 and S303 can be omitted by setting the number of retrievals and the granularity in advance. Incidentally, in FIG. 14, there is described the process of searching for the extent of influence by sequentially identifying a subordinate object from a superior object. It is also possible to search for the extent of influence by sequentially identifying a superior object from a subordinate object.

Effects of First Embodiment

As described above, the file management server 10 according to the present embodiment selectively displays, as a subordinate relationship to be set, either a relationship that an object selected first out of two objects is subordinate to the other object selected subsequently or a relationship that the subsequently-selected object is subordinate to the first-selected object. Therefore, the file management server 10 according to the present embodiment can execute association between objects having a subordinate relationship, and thus can search for the objects from a primary object toward a secondary object. Consequently, the file management server 10 according to the present embodiment can prevent a largely-unaffected file from being vainly searched, and can increase the possibility that a highly-useful file is contained in a search result. Accordingly, the file management server 10 according to the present embodiment can support an operation to set a subordinate relationship between files, thereby improving the accuracy of narrowing the extent of influence.

[b] Second Embodiment

The embodiment of the apparatus according to the present invention is explained above; however, the present invention can be embodied in various different forms other than the above-described embodiment. Other embodiments included in the present invention are explained below.

APPLICATION EXAMPLE

For example, the file management server 10 can determine whether any condition is met or not depending on whether folders of which the subordinate relationship has been defined are in a looped relationship. For example, assume that superior and subordinate objects which are included in the condition information 13c form the following series of associations. For example, it is assumed that there is formed a series of associations "file A→file B→file C→file D", where a file B is subordinate to a file A, a file C is subordinate to the file B, and a file D is subordinate to the file C. In this case, when an association operation designating the "file D" as a superior and the "file A" as a subordinate is made, if the association is permitted, the series of associations becomes "file A→file B→file C→file D→file A" and form a loop. When a series of associations form a loop in this way, the same file may be redundantly searched as a result of search for the extent of influence, and the accuracy of traceability may be reduced. Therefore, to suppress reduction in the accuracy of traceability, the file management server 10 can prohibit an association operation resulting in formation of a loop, for example, "file D→file A".

Division and Integration

Components of each apparatus illustrated in the drawings do not always have to be physically configured as illustrated in the drawings. Namely, the specific forms of division and integration of components of each apparatus are not limited to those illustrated in the drawings, and all or some of the components can be configured to be functionally or physically divided or integrated in arbitrary units depending on respective loads and use conditions, etc. For example, the registering unit 15a, the setting display unit 15b, the determining unit 15c, the associating unit 15d, or the search unit 15e can be connected to the file management server 10 via a network as an external device. Furthermore, the registering unit 15a, the setting display unit 15b, the determining unit 15c, the associating unit 15d, and the search unit 15e can be included in other devices respectively, and the above-described functions of the file management server 10 can be achieved in such a way that the devices are connected to a network and work together. Moreover, all or some of the file 13a, the object information 13b, the condition information 13c, and the association information 13d stored in the storage unit can be held by other devices respectively, and the above-described functions of the file management server 10 can be achieved in such a way that the devices are connected to a network and work together.

Search Program

The various processes described in the above embodiments can be realized by causing a computer, such as a personal computer or a workstation, to execute a program prepared in advance. An example of a computer that executes a search program having the same functions as those described in the above embodiments is explained below with FIG. 15.

Figure 15:
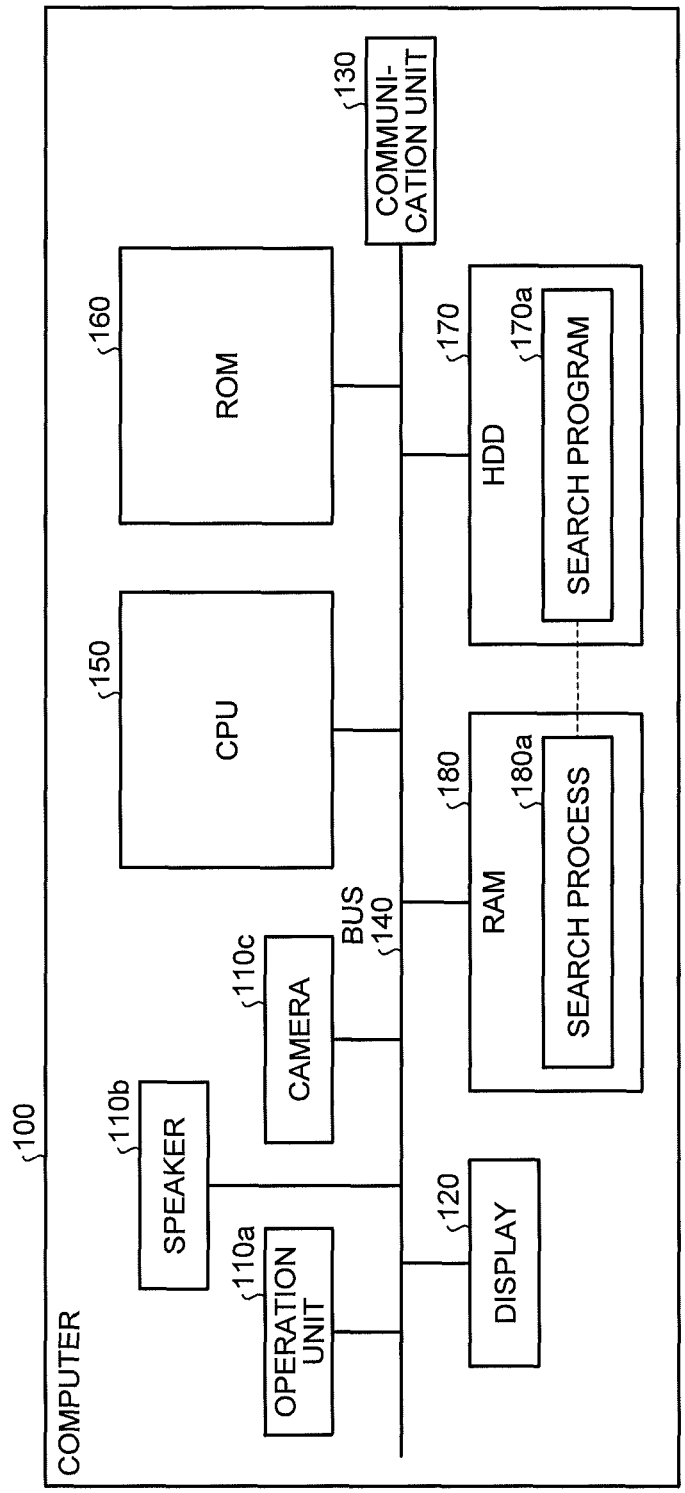
FIG. 15 is a diagram for explaining an example of a computer that executes a search program according to the first and second embodiments.

FIG. 15 is a diagram for explaining an example of a computer that executes a search program according to the first and second embodiments. As illustrated in FIG. 15, a computer 100 includes an operation unit 110a, a speaker 110b, a camera 110c, a display 120, and a communication unit 130. Furthermore, this computer 100 includes a CPU 150, a ROM 160, an HDD 170, and a RAM 180. These units 110 to 180 are connected via a bus 140.

As illustrated in FIG. 15, a search program 170a, which fulfills the same functions as the registering unit 15a, the setting display unit 15b, the determining unit 15c, the associating unit 15d, and the search unit 15e described in the first embodiment, has been stored in the HDD 170 in advance. This search program 170a can be arbitrarily integrated or divided just like the registering unit 15a, the setting display unit 15b, the determining unit 15c, the associating unit 15d, and the search unit 15e illustrated in FIG. 2. Namely, all of the respective items of the data stored in the HDD 170 does not have to be stored in the HDD 170, but only items of the data for the processing may be stored in the HDD 170.

Then, the CPU 150 reads out the search program 170a from the HDD 170, and expands the read search program 170a into the RAM 180. Accordingly, the search program 170a operates as a search process 180a as illustrated in FIG. 15. This search process 180a arbitrarily decompresses various data read out from the HDD 170 into an area of the RAM 180 allocated to the search process 180a, and executes various processes on the basis of the decompressed data. Incidentally, the search process 180a includes the processes performed by the registering unit 15a, the setting display unit 15b, the determining unit 15c, the associating unit 15d, and the search unit 15e illustrated in FIG. 2, such as the processes illustrated in FIGS. 13 and 14. Furthermore, all processing units virtually implemented on the CPU 150 do not always have to run on the CPU 150, and only a processing unit for a process just has to be virtually implemented.

Incidentally, the above-described search program 170a need not have stored in the HDD 170 or the ROM 160 from the beginning. For example, the search program 170a can be stored in a "portable physical medium", such as a flexible disk (FD), a CD-ROM, a DVD, a magnet-optical disk, or an IC card, to be inserted into the computer 100. Then, the computer 100 can acquire the program from the portable physical medium and execute the acquired program. Furthermore, the search program 170a can be stored in another computer or a server device which is connected to the computer 100 via a public circuit, the Internet, a LAN, or a WAN, and the computer 100 can acquire the program from another computer or the server device and execute the acquired program.

According to one embodiment, it is possible to support an operation to set a subordinate relationship between files, and therefore it is possible to improve the accuracy of narrowing the extent of influence.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a search program that controls a search range in accordance with a subordinate relationship between pieces of information, and that causes a computer to execute a process comprising:

acquiring selection order of a first file element and a second file element, the first file element and the second file element being partitions defined by partitioning display data of a document that is expanded by executing a file;

displaying, as a setting candidate of a subordinate relationship, a first subordinate relationship in which the second file element is subordinate to the first file element, and a second subordinate relationship in which the first subordinate relationship is reversed to have the first file element subordinate to the second file element, and displaying the first and the second subordinate relationships in a state in which either one of the first subordinate relationship and the second subordinate relationship is selected in accordance with the selection order; and setting, as the subordinate relationship, the one of the first subordinate relationship and the second subordinate relationship, so that the search range is narrowed down to improve the accuracy of narrowing the search range.

2. The non-transitory computer-readable recording medium according to claim 1, wherein the second file element is information on which the first file element is dragged and dropped, and the selection order is determined to be order that the first file element followed by the second file element.

3. The non-transitory computer-readable recording medium according to claim 1, wherein the search range is identified by tracing the information from information defined as a secondary to information defined as a primary in accordance with the subordinate relationship between the first file element and the second file element.

4. The non-transitory computer-readable recording medium according to claim 1, wherein the search range is identified by tracing the information from information defined as a primary to information defined as a secondary in accordance with the subordinate relationship between the first file element and the second file element.

5. The non-transitory computer-readable recording medium according to claim 3, wherein the process further comprises:

in the output of a search result in accordance with a subordinate relationship identified in the search, determining whether to output file elements between which the subordinate relationship has been set or to output respective files containing the file elements between which the subordinate relationship has been set.

6. A search method that controls a search range in accordance with a subordinate relationship between pieces of information, the search method comprising:

acquiring, using a processor, selection order of a first file element and a second file element, the first file element and the second file element being partitions defined by partitioning display data of a document that is expanded by executing a file; and displaying, as a setting candidate of a subordinate relationship, a first subordinate relationship in which the second file element is subordinate to the first file element, and a second subordinate relationship in which the first subordinate relationship is reversed to have the first file element subordinate to the second file element, and displaying the first and the second subordinate relationships in a state in which either one of the first subordinate relationship and the second subordinate relationship is selected in accordance with the selection order, using the processor; and setting, as the subordinate relationship, the one of the first subordinate relationship and the second subordinate relationship, so that the search range is narrowed down to improve the accuracy of narrowing the search range, using the processor.

7. An information processing apparatus for controlling a search range in accordance with a subordinate relationship between pieces of information, the information processing apparatus comprising:

a memory; and a processor coupled to the memory, wherein the processor executes a process comprising:

acquiring selection order of a first file element and a second file element, the first file element and the second file element being partitions defined by partitioning display data of a document that is expanded by executing a file; and displaying, as a setting candidate of a subordinate relationship, a first subordinate relationship in which the second file element is subordinate to the first file element, and a second subordinate relationship in which the first subordinate relationship is reversed to have the first file element subordinate to the second file element, and displaying the first and the second subordinate relationships in a state in which either one of the first subordinate relationship and the second subordinate relationship is selected in accordance with the selection order; and setting, as the subordinate relationship, the one of the first subordinate relationship and the second subordinate relationship, so that the search range is narrowed down to improve the accuracy of narrowing the search range.

8. The non-transitory computer-readable recording medium according to claim 1, wherein the process further comprises:

first setting either one of the first file element and the second file element as a superior file element in accordance with the subordinate relationship selected from the first subordinate relationship and the second subordinate relationship;

second setting either one of the first file element and the second file element as a subordinate file element in accordance with the subordinate relationship selected from the first subordinate relationship and the second subordinate relationship;

identifying a first folder to which a file including the superior file element belongs, and a second folder to which a file including the subordinate file element belongs;

determining whether the first folder corresponds to a superior folder and whether the second folder corresponds to a subordinate folder by referring to a memory that stores subordinate relationship defining the superior folder and the subordinate folder; and permitting association between the superior file element and the subordinate file element when the first folder corresponds to the superior folder and the second folder corresponds to the subordinate folder.

9. The non-transitory computer-readable recording medium according to claim 1, wherein the process further comprises:
- first setting either one of the first file element and the second file element as a superior file element in accordance with the subordinate relationship selected from the first subordinate relationship and the second subordinate relationship;
- second setting either one of the first file element and the second file element as a subordinate file element in accordance with the subordinate relationship selected from the first subordinate relationship and the second subordinate relationship;
- identifying a first file including the superior file element and a second file including the subordinate file element;
- determining whether the first file corresponds to a superior file and whether the second file corresponds to a subordinate file by referring to a memory that stores subordinate relationship defining the superior file and the subordinate file; and
- permitting association between the superior file element and the subordinate file element when the first file corresponds to the superior file and the second file corresponds to the subordinate file.

10. The non-transitory computer-readable recording medium according to claim 1, wherein the partitions are a cell in a spreadsheet.

* * * * *